United States Patent
Tsiartas et al.

(10) Patent No.: US 10,706,873 B2
(45) Date of Patent: Jul. 7, 2020

(54) REAL-TIME SPEAKER STATE ANALYTICS PLATFORM

(71) Applicant: SRI INTERNATIONAL, Menlo Park, CA (US)

(72) Inventors: Andreas Tsiartas, Santa Clara, CA (US); Elizabeth Shriberg, Berkeley, CA (US); Cory Albright, Helena, MT (US); Michael W. Frandsen, Helena, MT (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 15/179,816

(22) Filed: Jun. 10, 2016

(65) Prior Publication Data
US 2017/0084295 A1 Mar. 23, 2017

Related U.S. Application Data

(60) Provisional application No. 62/261,989, filed on Dec. 2, 2015, provisional application No. 62/286,788, filed
(Continued)

(51) Int. Cl.
*G10L 25/63* (2013.01)
*G10L 15/02* (2006.01)
(Continued)

(52) U.S. Cl.
CPC .......... *G10L 25/63* (2013.01); *G10L 15/1822* (2013.01); *G10L 15/32* (2013.01); *G10L 17/02* (2013.01); *G10L 17/08* (2013.01)

(58) Field of Classification Search
CPC ......... G10L 15/02; G10L 15/04; G10L 15/08; G10L 15/22; G10L 15/24; G10L 17/22;
(Continued)

(56) References Cited

U.S. PATENT DOCUMENTS 6,122,615 A * 9/2000 Yamamoto .............. G10L 17/00
704/243
6,161,090 A * 12/2000 Kanevsky ............... G10L 17/24
704/246
(Continued)

FOREIGN PATENT DOCUMENTS

| JP | 2000-245718 | 9/2000 |
|---|---|---|
| JP | 2004-233691 | 8/2004 |
| JP | 2004-240394 | 8/2004 |

OTHER PUBLICATIONS

International Search Report and Written Opinion for International Application No. PCT/US15/43862, dated Nov. 4, 2015, 15 pages.
(Continued)

*Primary Examiner* — Martin Lerner
(74) *Attorney, Agent, or Firm* — Hickman Palermo Becker Blngham LLP; Christine E. Orich

(57) ABSTRACT

Disclosed are machine learning-based technologies that analyze an audio input and provide speaker state predictions in response to the audio input. The speaker state predictions can be selected and customized for each of a variety of different applications.

20 Claims, 11 Drawing Sheets

Related U.S. Application Data on Jan. 25, 2016, provisional application No. 62/220,728, filed on Sep. 18, 2015.

(51) Int. Cl.
    *G10L 17/02* (2013.01)
    *G10L 17/08* (2013.01)
    *G10L 15/18* (2013.01)
    *G10L 15/32* (2013.01)

(58) Field of Classification Search
    CPC ............ G10L 17/26; G10L 2015/225; G10L 2015/226; G10L 17/02; G10L 25/63
    USPC ............... 704/231, 235, 236, 246, 249, 250
    See application file for complete search history.

(56) References Cited

U.S. PATENT DOCUMENTS

| | | | | |
|---|---|---|---|---|
| 6,424,946 | B1* | 7/2002 | Tritschler | G10L 15/26 704/251 |
| 6,665,644 | B1* | 12/2003 | Kanevsky | G10L 17/26 704/246 |
| 6,728,679 | B1* | 4/2004 | Strubbe | G06F 3/011 704/270.1 |
| 7,155,391 | B2* | 12/2006 | Taylor | G10L 15/005 704/235 |
| 8,694,307 | B2* | 4/2014 | Shammass | G10L 25/63 704/211 |
| 8,977,374 | B1* | 3/2015 | Eck | G10L 25/63 700/94 |
| 9,058,816 | B2 | 6/2015 | Lech | |
| 9,160,852 | B2* | 10/2015 | Ripa | G10L 25/48 |
| 9,208,778 | B2* | 12/2015 | Chopra | G10L 15/02 |
| 9,800,721 | B2 | 10/2017 | Gainsboro | |
| 9,818,410 | B2* | 11/2017 | Sak | G10L 15/16 |
| 9,965,553 | B2 | 5/2018 | Lyren | |
| 10,084,920 | B1* | 9/2018 | Gainsboro | H04M 3/2281 |
| 2004/0158465 | A1* | 8/2004 | Rees | G10L 15/04 704/233 |
| 2005/0102135 | A1* | 5/2005 | Goronzy | G10L 15/00 704/213 |
| 2007/0071206 | A1* | 3/2007 | Gainsboro | H04M 3/2281 379/168 |
| 2008/0256576 | A1* | 10/2008 | Nesvadba | H04H 60/59 725/39 |
| 2009/0043586 | A1 | 2/2009 | MacAuslan | |
| 2009/0063605 | A1* | 3/2009 | Nakajima | G06F 17/15 708/422 |
| 2011/0010173 | A1* | 1/2011 | Scott | H04M 3/42221 704/235 |
| 2011/0202337 | A1* | 8/2011 | Fuchs | G10L 19/22 704/231 |
| 2011/0249811 | A1* | 10/2011 | Conway | G10L 15/1822 704/9 |
| 2012/0116186 | A1 | 5/2012 | Shrivastav et al. | |
| 2012/0215535 | A1* | 8/2012 | Wasserblat | G10L 15/26 704/243 |
| 2013/0166291 | A1 | 6/2013 | Leach | |
| 2014/0095150 | A1* | 4/2014 | Berjikly | G06F 17/2785 704/9 |
| 2014/0163960 | A1* | 6/2014 | Dimitriadis | G10L 25/63 704/9 |
| 2014/0249823 | A1 | 9/2014 | Hayakawa | |
| 2015/0213800 | A1* | 7/2015 | Krishnan | G10L 25/63 704/246 |
| 2015/0318002 | A1 | 11/2015 | Karam | |
| 2016/0071520 | A1 | 3/2016 | Hayakawa | |
| 2016/0111086 | A1* | 4/2016 | Ziolko | G10L 15/14 704/240 |

OTHER PUBLICATIONS

Mitra et al., "Articulatory Trajectories for Large-Vocabulary Speech Recognition" dated 2013, IEEE International Conference on Acoustics, Speech and Signal Processing, pp. 7145-7149.

Liu et al., "Cough Signal Recognition with Gammatone Cepstral Coefficients", IEEE, dated Jul. 2013, China Summit and International Conference Signal and Information Processing Signal, pp. 160-164.

Low et al., "Detection of Clinical Depression in Adolescents Speech During Family Interactions", IEEE Transactions on Biomedical Engineering, vol. 58, No. 3, dated Mar. 2011, 13 pages.

Helfer et al, "Classification of Depression State Based on Articulatory Precision", In Interspeech dated 2013, 5 pages.

European Patent Office, "Search Report" in application No. 15 834 564.5-1207, dated May 15, 2019, 7 pages.

European Claims in application No. 15 834 564.5-1207, dated May 2019, 2 pages.

Cen et al., "Speech Emotion Recogniton Using Canonical Correlation Analysis and Probabilistic Neural Network", 2008 Seventh International Conference on Machine Learning and Applications, 4 pages.

Knoth, U.S. Appl. No. 15/505,577, filed Feb. 21, 2017, Notice of Allowance, dated Jul. 17, 2019.

Notice of Grounds for Rejection in application No. 2017-509749, dated Jun. 26, 2019, 6 pages.

Current Claims in application No. PCT/US2015/043862, dated Jun. 2019, 3 pages.

\* cited by examiner

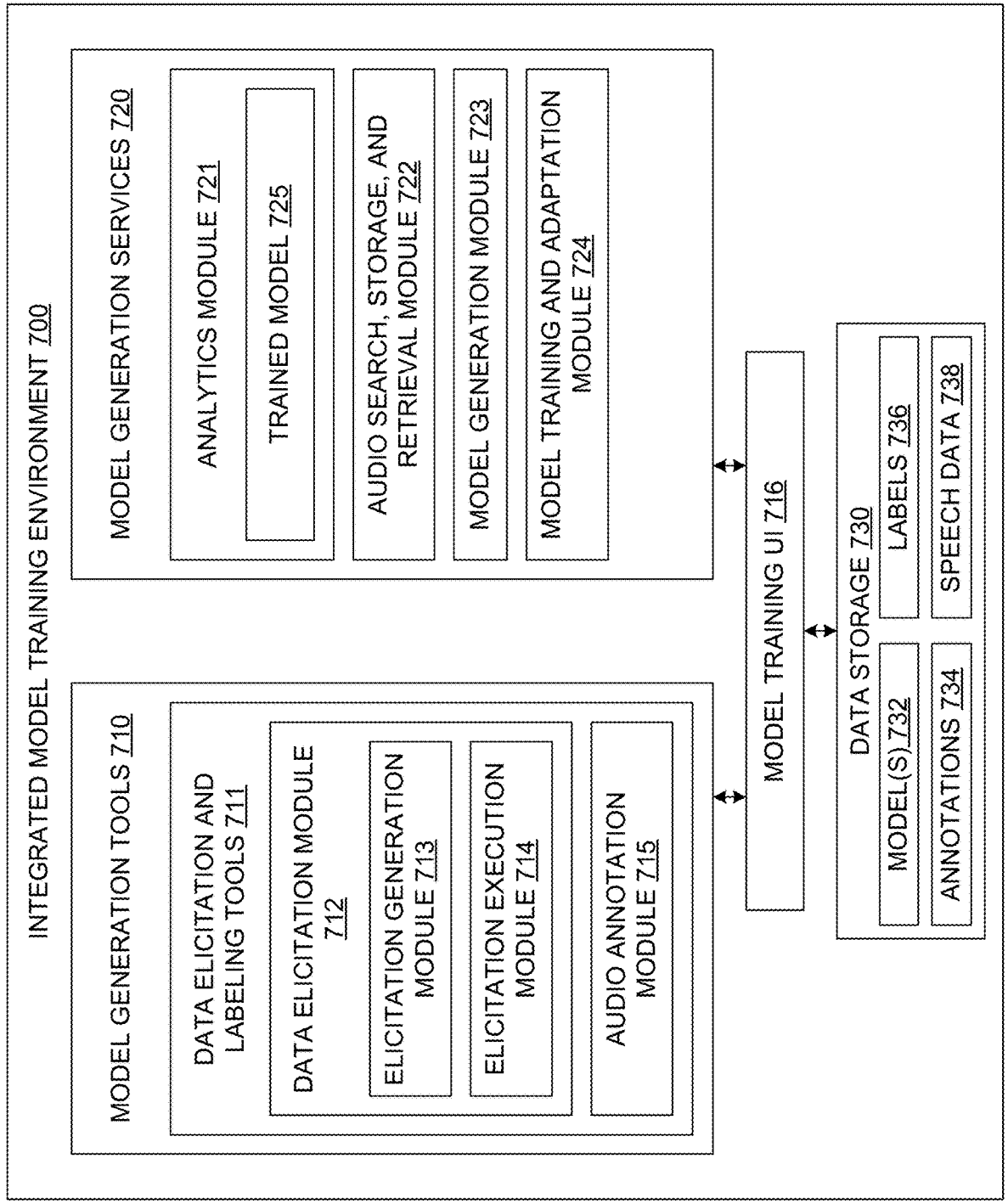

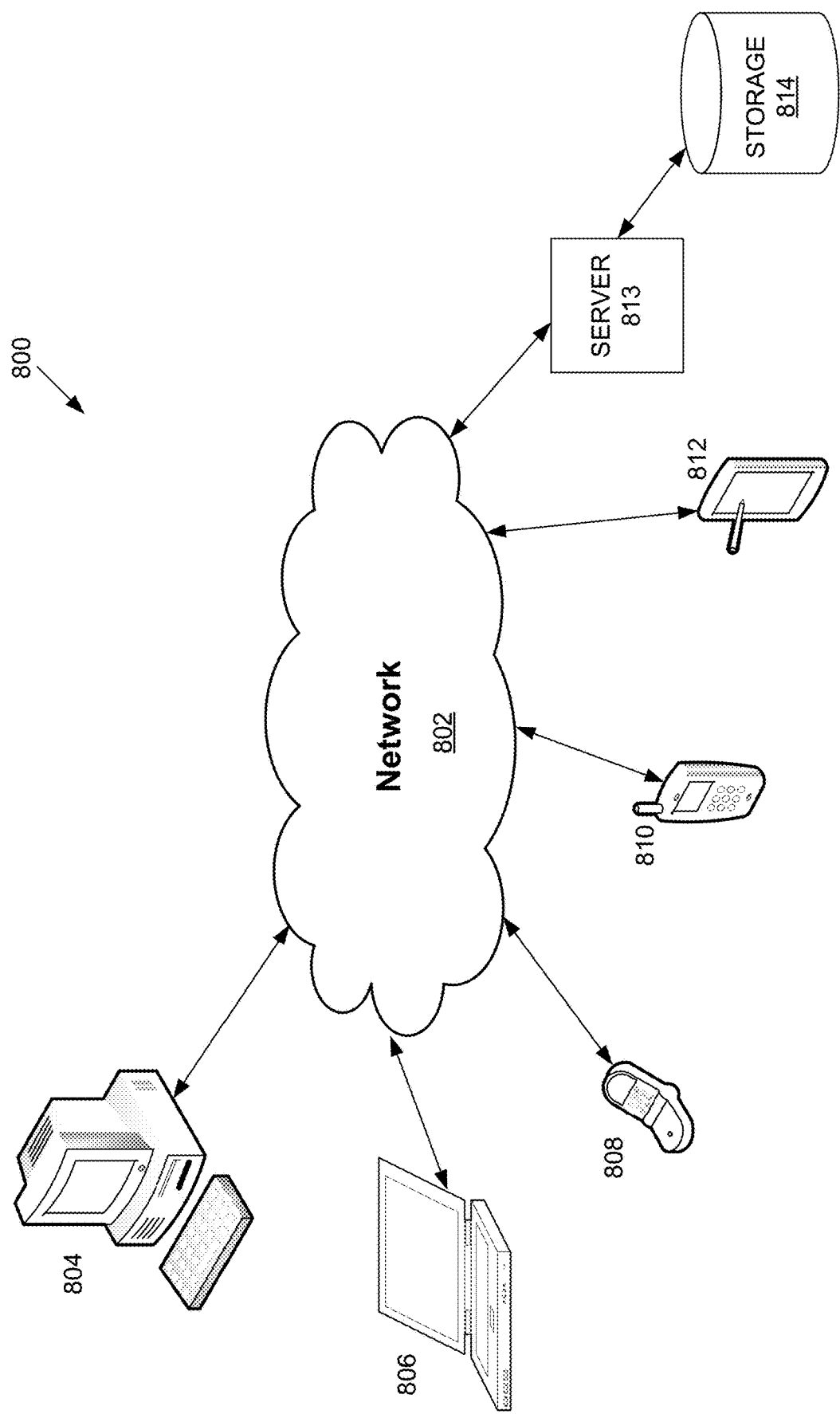

REAL-TIME SPEAKER STATE ANALYTICS PLATFORM

CROSS-REFERENCE TO RELATED APPLICATION

This application claims the benefit of U.S. Provisional Patent Application Ser. No. 62/261,989, titled REAL-TIME SPEECH ANALYTICS FOR TRACKING SPEAKER STATE and filed on Dec. 2, 2015, the content of which is hereby fully incorporated by reference herein.

This application also claims the benefit of U.S. Provisional Patent Application Ser. No. 62/286,788, titled REAL-TIME SPEAKER STATE ANALYTICS PLATFORM and filed on Jan. 25, 2016, the content of which is hereby fully incorporated by reference herein.

This application also claims the benefit of U.S. Provisional Patent Application Ser. No. 62/220,728, titled A METHOD FOR PREDICTING HEART RATE CHANGES FROM SPEECH and filed on Sep. 18, 2015, the content of which is hereby fully incorporated by reference herein.

BACKGROUND

Humans naturally use speech to communicate with other people, and also to communicate with machines (such as mobile computing devices and appliances). A speech signal as used herein generally refers to an audio signal that contains sounds and/or speech made by one or more human person(s). An audio signal as used herein generally refers to an acoustic signal, which can be captured or otherwise received by a sound capture device, such as a microphone. The received acoustic signal may be converted to a digital form by, e.g., an analog-to-digital converter (ADC) or other suitable device or component. The digital form of the acoustic signal may be stored in non-transitory media, e.g. computer memory or a data storage device. Algorithms implemented with computer technology can extract various information from the speech signal. The extracted information may include the words that are spoken by the speaker, non-word sounds (such as grunts, sighs, laughter, etc.) and/or information about how those words (or other non-word sounds) are produced by the speaker (e.g., intonation, loudness, speaking rate, timing, etc.).

BRIEF DESCRIPTION OF THE DRAWINGS

FIG. 7 is a simplified block diagram illustrating an example of an integrated training environment (ITE), which may be used interactively or in an automated fashion to generate and train one or more models for use by the speech analytics platform of FIG. 1.

FIG. 8 is a simplified block diagram illustrating an example of a networked computing system in which embodiments of the disclosed technology may be implemented.

DETAILED DESCRIPTION

Figure 1:
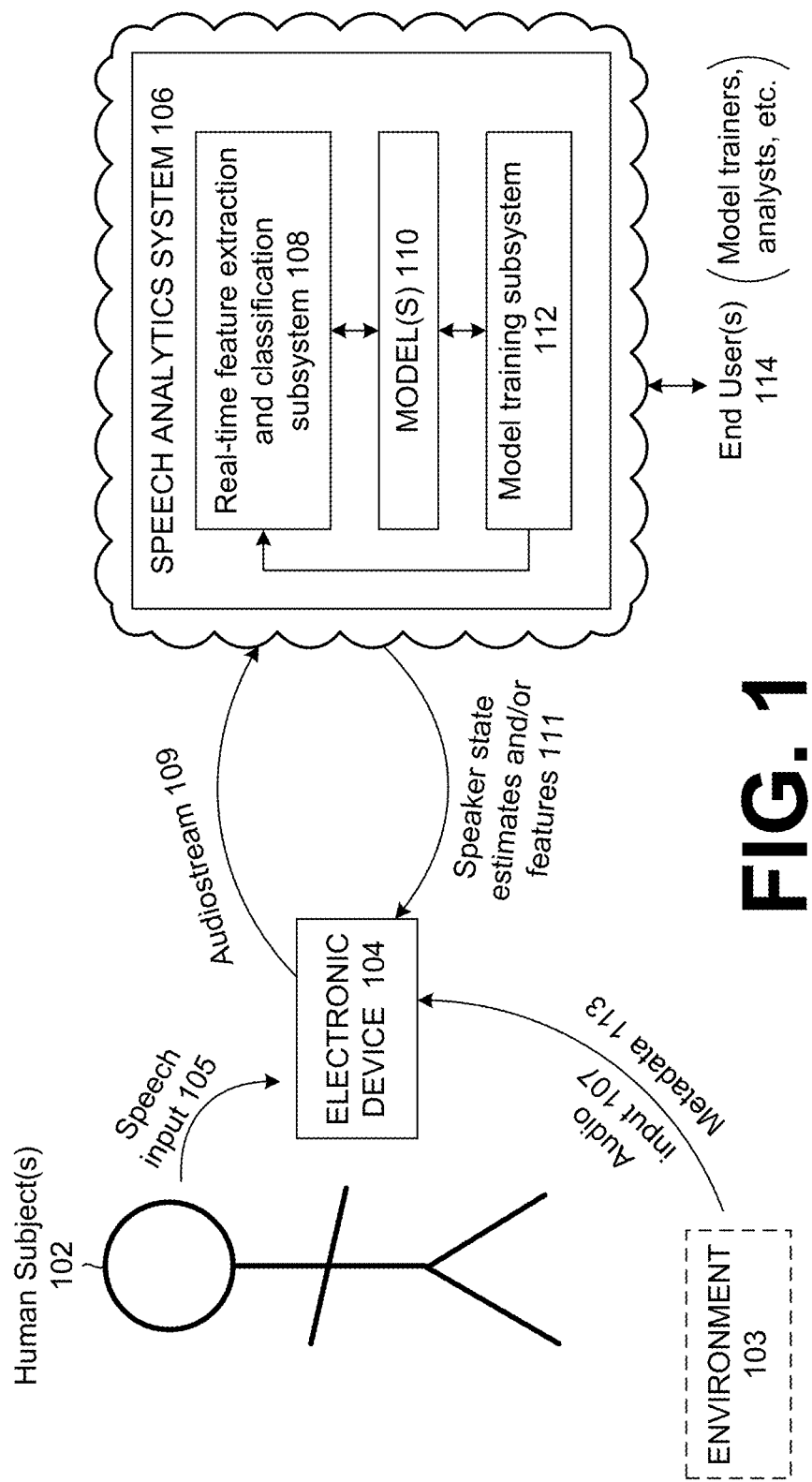
FIG. 1 is a simplified schematic diagram illustrating usage scenarios for an embodiment of a speech analytics system implemented with the technology disclosed herein.

Rudimentary systems for speech-based systems for emotion detection exist. However, the conventional systems function as a "black box," and are not configurable for particular needs or applications. Many such systems typically rely heavily on word-based (lexical) information. Some existing systems may utilize very simple non-word features (e.g. duration, overlap, and acoustic or prosodic features) for emotion detection. However, the known approaches are usually not properly normalized for the particular speaker and/or speaking conditions. Further, conventional systems have not been able to effectively analyze simple non-word features over short time scales. Short time scales traditionally yield poor results for speaker state detection because, while they may be effective at distinguishing phonetic sounds, short time scales have not been effective at determining speaker state irrespective of the content of the speech (the words that have been spoken). Existing systems do not respond well to changes in channel and noise conditions. Additionally, current systems are typically not capable of real-time use, and are typically not implemented—or capable of being implemented—in efficient software.

The disclosed technologies improve the state of the art by providing, among other things, a flexible, adaptable, real-time speech analytics system architecture. The disclosed platform enables the efficient creation and deployment of domain-specific or multi-purpose speech analytics applications, including real-time or interaction-time speech-based analytics systems and methods for detecting various aspects of a speaker's state in accordance with the requirements of a particular domain or application.

Embodiments of the disclosed technology generally pertain to the tracking, detection, classification, and/or prediction of the physical, emotional, physiological, psychological, or cognitive state of a single speaker or of multiple speakers, e.g., during a structured or unstructured conversation, using only information extracted from an audio signal that includes sounds made by the human voice of the one or more speakers (e.g., spoken language and non-word vocalizations). For example, the state of a speaker (or of an entire conversation, in some cases) may be determined, based on the audio signal, to be emotional, e.g., angry, happy, or nervous, cognitive, e.g., bored, confused, or motivated, health-related, e.g., stressed, fatigued, or having low blood sugar or cognitive decline. Certain implementations of the disclosed technology also pertain to the perception of these speaker states by other listeners (e.g., person(s) observing the conversation or speaking session).

Implementations of the disclosed technology may include: call center analytics; intelligent, personalized, and context-aware human-computer and human-robot voice-based interaction; driver safety; entertainment; medical triage, diagnosis and monitoring; self-monitoring; self-improvement; education; training; intelligence (e.g., filtering); audio media search; social trend analysis; motivational interviewing; sentiment analysis; advertising; commentary (e.g., sports or video games); highlighting and segmentation; defense and government intelligence; social media analytics; mental health state monitoring; student collaboration, assessment and analytics; and various other types of applications.

Automatic speech recognizers (ASRs) convert audio input into a mere stream of words (the words spoken) and are generally agnostic as to the speaker's state. The systems and machine-implemented methods described herein can detect a speaker's state, by analyzing words and/or non-word features extracted from the audio signal, as described in more detail below.

Certain implementations of the disclosed technology may include "real-time" (or "interaction time") prediction of classes (e.g., categories or labels describing speaker states) based on speech features as well as the integration of acoustic features. The disclosed technical advances include computer-implemented techniques that enable the classes to be predicted accurately and reliably even though short time windows are used to capture the features. As used herein, "real time" or "interactive time" generally refers to the production of a system response without a significant time delay, i.e., within a short enough amount of time that the end user of the system receives the system's response in an interactive fashion, even while the user is still continuing speaking, in some cases. As used herein, the term "speech" or "speech feature" generally refers to information extracted from the audio signal that pertains to the content of what is said (e.g., lexical information, or words or phrases) and/or the manner in which the words or phrases are spoken by the particular user (e.g., acoustics, pronunciation, emphasis, loudness, phonetics, timing, pausing, intonation, rhythm, speaking rate, and quality of the voice). Speech or speech features may also include non-lexical information such as laughter, sighing, or breathing patterns, as well as other characteristics that can be gleaned from the voice signal, such as hoarseness or wheezing, for example, even if the person is not talking at the particular moment in which these occur.

The term "speech" or "speech features" as used herein may also include characteristics that are computed on the basis of speaking patterns of one or more talkers, such as statistics on utterance durations, inter-utterance pauses, or overlap patterns across multiple speakers, for example. Speech or speech features may also include characteristics that are preserved after automatic speech recognition, e.g., words, but also output not usually rendered such as pauses, fillers, or word pronunciations. Speech may include spontaneous talking, reading, responding to inputs, or the production of sounds on demand. Speech may include talking that is directed to another person(s) or entity, contemporaneously or delayed, or to an automatic system, or to oneself. For ease of discussion, references to "speech" in this document may be considered as encompassing any form of vocal output, including spoken words and non-lexical features.

As used herein, the term "speaker" generally refers to a source of speech, e.g., a talker, whether the talking is live or pre-recorded, and whether the speech is generated by a human person or synthetically produced. Certain implementations of the disclosed technology can be used for a single speaker at a time (e.g., a single person interacting with a computing device), or for a conversation that includes multiple speakers (e.g. a recorded meeting).

As used herein the term "state" (also referred to as "speaker state") generally refers to one or more conditions and/or one or more characteristics that describe the speaker. The state is associated with the point in time at or time interval during which the associated speech sample was obtained. State typically refers to a condition that may change over time for a given speaker. Examples of states may include emotional states (e.g., happy, sad, angry, surprised, fearful, emotional arousal, and emotional valence), cognitive or cognitive-affective states (e.g., confused, bored, confident, engaged, fluent, and committed/motivated), and both physical health and mental health states (e.g., depressed, stressed, PTSD, brain injury, Parkinson's disease, tired/sleepy, inebriated, illness (temporary or chronic), drug effects, hypoxia, and low blood sugar). State as used herein may also refer to personality traits (e.g., openness and agreeableness) and/or states that typically change slowly over time (e.g., Alzheimer's disease).

As used herein, "state" may refer to an actual condition or characteristic of the speaker, a self-report from the speaker, or a diagnosed, perceived, or inferred state of the speaker. For example, a person may report that he or she is angry (a self-reported state), or may be perceived by another participant in the conversation as being angry (a perceived state), or be diagnosed by a therapist as being angry, or be labeled as angry via a poll or group of annotators observing the person's behavior or listening to the person's speech (an inferred state).

In certain implementations of the disclosed technology, a speaker state may be represented by one or more text, numerical, or alphanumeric data values. For instance, a speaker state may be indicated by a class label (e.g., "angry") or an annotation (e.g., a tag indicating that the tagged portion of the speech is associated with a particular speaker state (e.g. "angry"). Alternatively or in addition, a speaker state may be represented by a numerical score, such as a probability or statistical likelihood that the speech features indicate a particular speaker state (e.g., "0.27 angry"). The score, probability, or other numerical value(s) may be mathematically computed or determined by consulting a reference, such as a lookup table or other data source. The speaker state data value(s) may include a measure of degree or confidence in the state determination. For example, a speaker state may be represented by a number within a pre-defined range, such as between 0 and 1, or with reference to a threshold (e.g., above or below 10). A lower speaker state value may indicate that the speaker state has been detected to a lesser degree (e.g. mildly angry) or that the system's confidence in the speaker state determination is low (e.g., might be angry). A higher speaker state value may indicate that the speaker state has been detected to a higher degree (e.g., enraged) or that the system's confidence in the speaker state determination is high (e.g., definitely angry).

As used herein, the term "interaction-time" may generally refer to the span of time (e.g., a time interval or a duration of a time period) within which a speech sample of interest is being produced (if live) or being input to the system (if from a file or another source).

The terms "detection," "classification," "prediction," "tracking," and "monitoring" are used in accordance with customary definitions in the technical field of machine learning, in which the state is the class (or class score or class probability). In general, these terms may be used interchangeably; however, the terms tracking and monitoring are typically used when the goal is to observe how the speech of a particular speaker or group changes over a time interval (based on multiple samples collected during a time interval, as opposed to a state detection made based on a single sample taken at a specific time instance, for example).

Certain implementations of the disclosed technology include systems and/or methods for tracking a speaker state by automatically extracting diverse and sophisticated speech features or "indicators" from a talker or from a conversation. Such indicators are then modeled by machine learning to predict speaker states. While state prediction generally relies on some amount of state-labeled training data for model training, the indicators are directly measured from the speech and, therefore, do not require training data or labels. Thus, indicators may include certain of the raw speech features that are extracted from an audio sample, while states may be interpretations of the raw speech features, where the interpretations are made by the computer, by a human analyst, or by a combination of computer processing and human analysis. The indicators themselves can be an important output of the system and may be used in subsequent analysis, for augmentation of simpler speech analytics approaches, and for fusion with information from other modalities such as text, video, sensors, etc.

As used herein, features extracted from the audio signal may include word-based (lexical), part-of-speech based, ASR-information-based (e.g., N-best, durations, confidences, lattice based, pronunciations, phones, or syllables), acoustic (e.g., cepstral, spectral, spectral-temporal, or noise-robust), articulatory (e.g., based on how human speech articulators move), phonetic (e.g., phonetic patterns of the signal and ASR output), auditory inspired (e.g., based on how the human auditory system processes speech), prosodic (e.g., intonation, timing, pausing, rate, loudness, voice quality patterns, and speech variability), speech/non-speech/voicing patterns, voicing percentage, intonation dynamics, turn-taking patterns, overlap patterns, discourse patterns (types of words used to manage interaction), pauses, filler words from ASR, or any combination thereof. Embodiments of the disclosed technology generally pertain to a computerized platform that can be used to extract and analyze various indicators of a speaker's state from a speech signal, even if the speech signal is captured with detracting environmental or channel characteristics (such as in a noisy environment, for example). Such embodiments may include a platform that is configurable to perform different types of speaker state analytics in real-time or "on demand," e.g., as needed in accordance with the requirements of a particular implementation of the system. For example, such a platform may determine which speaker state analytics are to be performed based on, e.g., the speaker's current context or in response to a detection of certain features in portions of the speech signal. Types of speaker state indicators that may be inferred from the speech analytics output by the disclosed system may include, for example, emotional, cognitive, and physiological state indicators, as well as any change in state indicators. That is, certain implementations may detect, based on features extracted from one or more speech signals, changes in the speaker's state, e.g., happy to nervous, motivated to confused, and mildly pleased to ecstatic.

Certain implementations of the disclosed technology may include systems configured to provide local and/or global data summaries and/or visualizations for both class output and feature outputs over time, typically as selected by the user. Such systems may also provide a template of algorithms (e.g., one or more algorithms) to run and "take notice" for thresholds on certain metrics after getting raw outputs from system. Summaries may then be made available in an interpretable manner to users. Thus, statistics and/or visualizations may be advantageously provided for any or all of the following: history and/or background data comparisons; archival and/or retrieval of output data; distilling of output (e.g., highlights of raw feature output); and interpretation and/or summaries of output data.

In certain embodiments, the system may allow a user to edit, update, and/or create any or all of the templates the system uses for distillation and user interpretation. Such systems may provide statistical analysis and/or highlights of states and/or features (e.g., mean/minimum/maximum quartiles for current versus prior sample(s) from the speaker or a population model) or highlights of patterns that do-versus-do-not look similar to a comparative standard (e.g., which features look similar to a prior sample and which differ, how they differ, etc.).

Implementations of the disclosed technology generally pertain to platforms, systems, and methods for speech-based speaker state analytics that may be implemented using one or more computing devices, e.g., in hardware, in firmware, in software, or in a combination of hardware, firmware, and/or software. For example, FIG. 1 is a block diagram illustrating an example of scenarios in which an embodiment of a speech analytics system 106 implemented with the disclosed technologies may be used. A human subject, user 102, uses an electronic device 104, e.g., a mobile computing device (such as a tablet, smartphone, wearable device, body-mounted device, or smart appliance), to interact with the illustrative cloud-based real-time or interaction-time speech analytics system 106 in accordance with certain embodiments of the disclosed technology. In the example, the person 102 may provide speech input 105, e.g., spoken words or expressions, which is captured by e.g., one or more microphones of the electronic device 104 and/or other microphone(s) present in the surrounding environment 103 (such as microphones of other users' mobile devices and/or Internet of Things devices). The electronic device 104 may in turn convert the speech input 105 into a digital audio (speech) stream 109 and provide the audio stream 109 to the speech analytics system 106.

In certain embodiments, the electronic device 104 may also be configured (e.g., with additional microphones or multidirectional microphones or other sensors) to perform ambient sensing by retrieving or otherwise receiving other audio input (e.g. speech, sounds) 107, and/or other data (e.g., other sensed data, metadata, etc.) that is detected in the user's surrounding physical and/or virtual environment 103. In such embodiments, the microphone(s) and/or other sensor(s) of the electronic device 104 and/or the environment 103 may advantageously pick up other audio inputs 107 and/or other signals from the surrounding context, in addition to the speech input 105 captured from the user (where the user may likely be physically located nearest to a microphone connected to the electronic device 104).

The speech analytics system 106 may provide real-time speaker state estimates and/or features 111, which may be fed back to the electronic device 104 or to electronic device(s) of one or more end user(s) 114 (e.g., model trainers, analysts), such that the electronic device 104 and/or other electronic device(s) can then present the speaker state information 111 to the user(s) 102, 114, e.g., by way of an output device such as a display screen or touchscreen of the electronic device 104 and/or other electronic device(s). In this way, the speech analytics system 106 can be used to immediately or interactively inform the user 102 and/or any of the end user(s) 114 that based on the user 102's current speech characteristics, the user 102 appears to be frustrated, tired, etc. The responsiveness of which the speech analytics system 106 is capable can, among other things, allow the user 102 or another participant in the conversation to adjust their speaking mid-stream so as to improve the quality of the current interaction.

FIG. 1 also illustrates high-level components of the speech analytics system 106. The illustrative speech analytics system 106 includes a real-time feature extraction and classification subsystem 108, one or more model(s) 110 (which may be trained by applying machine learning algorithms to a set of training data), and a model training subsystem 112. The model(s) 110 are accessed and used by the real-time feature extraction and classification subsystem 108 to interpret the features extracted from the speech signal (e.g., audio stream 109). Various different model(s) may be utilized by the speech analytics system 106 for different applications, domains, or end users (human subjects), for example. The model training subsystem 112 provides automated tools for generating the model(s) 110. The real-time feature extraction and classification subsystem 108 and the model training subsystem 112 may be tightly coupled such that feature extraction, model adaptation, and classification of the speech input 105 can occur asynchronously, e.g., continuously over the course of a speech session as the session progresses. For example, in some embodiments, the speech analytics system 106 can dynamically vary the time interval ("time window") over which a speech sample is segmented, depending on the duration of the speaker's speech session. That is, when the speaker 102 first starts to speak, the system 106 may begin with a small window size (e.g., in the range of about 0.5 seconds), based an initial assumption that the user will only speak for a short duration of time. However, if the user continues speaking for a longer period of time, the system 106 can dynamically and continuously change the size of the time window as the user continues to speak, so that longer segments of speech are accumulated. Longer-duration speech segments can permit the system 106 to extract and utilize different or additional features that would not be possible or feasible with shorter-duration speech segments. The initial window size, the triggers for initiating the dynamic adjusting of the window size, the amount(s) of time by which the window size is adjusted in response to each trigger, and the maximum window size (e.g., in the range of about 15 seconds, in some implementations), can all be configured based on the requirements of a particular speech analytics application.

As discussed above, a set of end users 114 may interact with and utilize the output of the system 106, as well. The end users 114 may include model trainers, who may help build the trained model(s) 110 by annotating speech data or reviewing automatically generated annotations. The end users 114 may, alternatively or in addition, include analysts who may access the system 106 using an electronic device similar to the device 104, and may utilize the speaker state output (e.g., 111) for various purposes. As such, the end users 114 may include medical professionals, health care workers, counselors, and educators, among others. Exemplary embodiments of these components are described in the text that follows, with reference to the subsequent figures.

In certain embodiments, the speech analytics system 106 is implemented in an apparatus, which may include one or more computing devices, each of which include at least memory, e.g., non-transitory machine readable storage media (such as random access memory and/or read only memory), a processor (e.g., one or more microprocessors), at least one input device (such as a microphone), and at least one output device (such as a speaker and/or display). Such apparatus may include a signal preprocessing component, e.g., a subsystem or module, configured to enable real-time/interaction-time analytics such as speech signal segmentation, speech activity detection, etc. The apparatus may also include a library of analytics engines, where each analytics engine may be configured, e.g., executable by a processor, to provide as output a different type of speaker state indicator.

Each analytics engine may include a component configured to perform selective feature extraction based on criteria such as the objective of the particular analytics engine, speech context, e.g., the user's current activity and/or information about the user's physical environment. Each analytics engine or the platform more generally may include a component configured to perform automated extraction of verbal word content and/or non-verbal acoustic features/indicators from a speech signal. The analytics engine or the platform more generally may utilize verbal content extracted from the speech signal (such as words or phrases), non-verbal acoustic features/indicators (such as prosodic features and/or others), articulatory features (e.g., how the speaker's tongue moves during the speech), phonetic features, spectral features, or a combination of verbal features and non-verbal features, e.g., in the performance of a particular speech analytics task.

Features extracted and analyzed by the analytics engines may be selected from different types or categories of features, such as: "low-level/static" features, e.g. pitch; calculated features, such as pitch contour; dynamic features such as speaking rate; "derived" features such as an interpretation of speaking rate as indicating "happy" or "agitated"; or "relative," where the meaning of the feature or indicator generally involves a comparison to one or more previously-obtained speech analytics of a particular user (such as a comparison of the user's current speech-based analytics to the user's previously measured analytics, which may indicate a change in the user's state over a period of time), or a comparison to a population of users, e.g., a comparison of the user's particular analytics to a set of analytics that are representative of a selected reference demographic such as age, gender, language fluency, etc.

Figure 2:
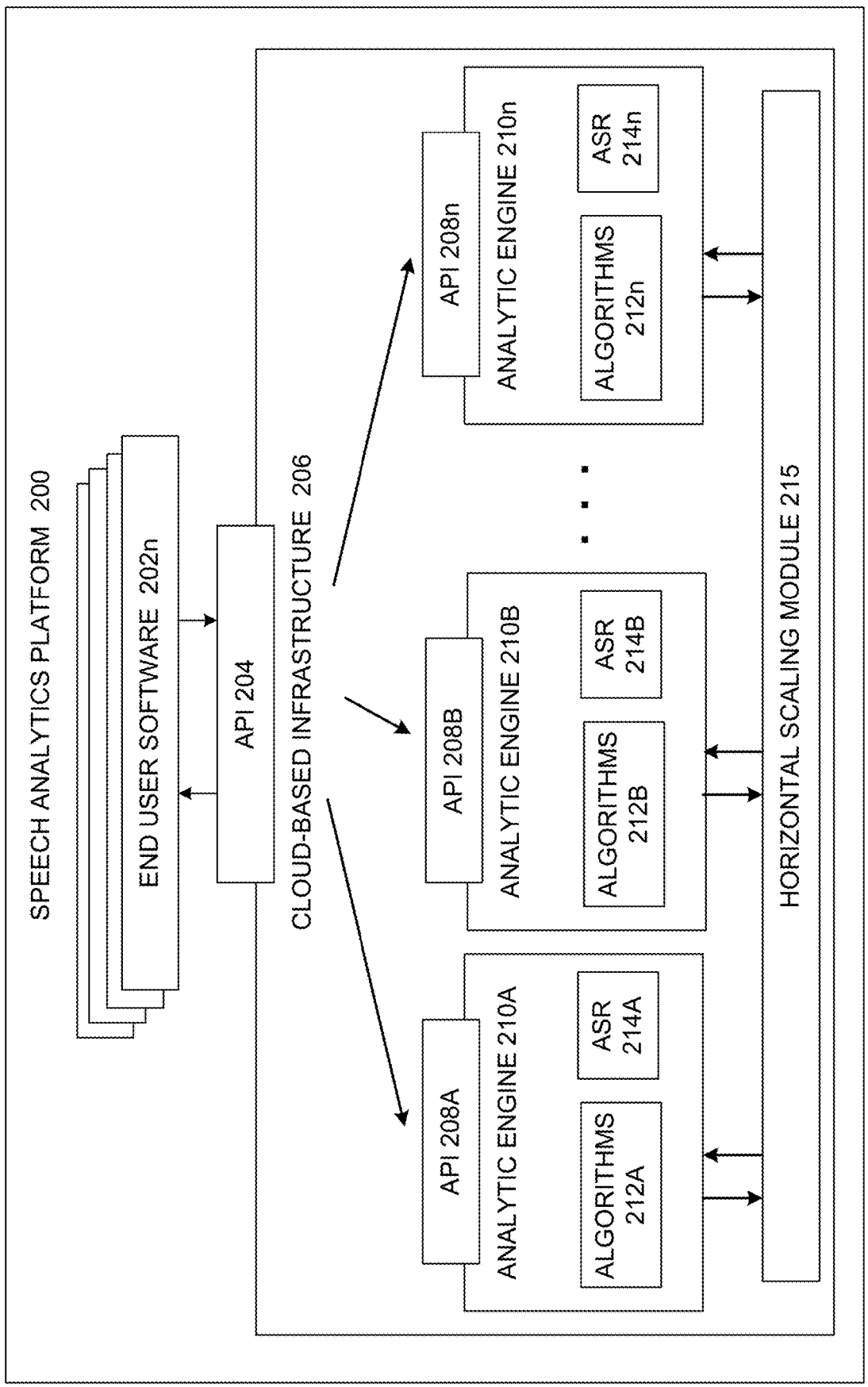
FIG. 2 is a simplified block diagram illustrating an an embodiment of a machine-implemented architecture for the speech analytics system of FIG. 1.

FIG. 2 is a block diagram illustrating an embodiment 200 of the real-time speech analytics platform 106. In the example, the platform 200 includes multiple end user software 202n, e.g., any of a variety of suitable customer software, interacting with a cloud-based infrastructure 206 by way of an application programming interface (API) 204. The cloud-based infrastructure 206 can provide ease of deployment, integration with multiple different end user applications, and scaling to a large number of users and data. In some implementations, the end user software 202n may be external to the speech analytics platform 200 and communicate with the platform 200 over a network (e.g., the Internet), rather than implemented within the platform 200 as shown in the figure.

The speech analytics platform 200 also includes a plurality of speech analytics engines 210A-n, such as the analytics engines described above, that may each interact with the cloud-based infrastructure 206 by way of APIs 208A-n. The APIs 208A-n may be C language APIs or any other suitable type of API for providing an interface between the analytics engines 210A-n and the cloud-based infrastructure 206. The speech analytics engines 210A-n include speech analytics algorithms 212A-n and automatic speech recognition (ASR) modules 214A-n. The ASR output can include transcription, timestamps, phonemes, or any combination thereof, for example. The algorithms 212A-n are particularly advantageous in that they may compile into a standalone C library, for example, and may readily and easily integrate into any of a number of suitable environments. C APIs are a well-recognized baseline and can easily be accessed through Java (JNI), Python, etc. A horizontal scaling module 215 is configured to coordinate the interactions of the speech analytics engines 210A-n. For example, the horizontal scaling module 215 may allow the system 106 to extract more than one feature at a time, or perform more than one analytics task at a time, or analyze more than one user's speech at a time.

In certain embodiments, the platform 200 may be configured to perform feature conditioning, e.g., use of verbal content to then determine which feature to analyze, or vice versa, use a feature to determine which verbal content to use in a particular analysis. For example, the platform 200 may select and use only those words that have a pitch measurement that is above or below a certain threshold. Certain versions of the platform or particular analytics engines may perform a correlation of extracted feature(s) with high-level (and perhaps non-traditional) indicators of speaker state. In certain versions of the platform, an output generation module may include a synchronization mechanism, e.g. dynamic windowing, to temporally align the indicator output with the speech signal input. The platform may facilitate the provision of speech-based speaker state analytics "as a service," e.g., using a "software as a service" (SAAS) model.

In certain embodiments, a method or process for development of a customized real-time/interaction-time speaker state analytics module/system, e.g., in which the speaker state analytics may be derived from a speech signal, can be implemented using one or more computing devices configured to selectively extract features based on one or more criteria, e.g., where the one or more criteria may be customized (such as for a particular application, context, or user); label features based on the selected criteria; using the labeled data, build a model to analyze one or more input speech signals for features/indicators relating to the selected criterion/criteria; configure an analytics engine based on the model; and instantiate the analytics engine in a speaker state analytics module/system. The method may facilitate the creation, development, or automated generation of a custom/personalized speech analytics application or "app."

The underlying technical architecture of the speech analytics platform 200 may include an arrangement and coordination of a family of software components that enable on-demand speech-based analytics that can be customized for any of a wide variety of suitable client-based needs and/or applications.

In certain embodiments, an electronic device, system, or computer program product may be configured using the techniques and technologies described herein to provide as output real-time or interaction-time speech-derived speaker state analytics data. Such as device, system, or computer program product can, for example, output a temporal stream of speaker state indicators in real-time or interaction-time, e.g. as feedback to the speaker during a "live" speech session. Certain implementations of the device, system, or computer program product can compare a current set of speech-derived speaker state indicators to indicators derived from the speaker's previous speech instances or speech session(s), e.g., the indicators that are output can be measured relative to a reference model, where the reference model may be personalized to the user, or designed to detect a certain condition/speaker state, etc., and output data relating to the comparison (e.g., an indication of direction of change of an aspect of the speaker's state, such as increasing or decreasing agitation).

In certain implementations, the system may be used to find regions of interest in a stream of spoken audio. In this mode, the class score outputs, either alone or in combination with continuity constraints, may be used to determine the start and end times for multiple regions of interest. The algorithm can return a set of tuples that include the regions and the features or the scores. The regions may be overlapping or non-overlapping depending on the application and the number of analytic outputs. For example, in a running commentary of a recorded event, such as a news broadcast, sporting event, or video game, a speech arousal score may be thresholded to find the start and end times of multiple locations of high commentator arousal. The threshold can be directly applied to the analytic scores or to the individual features. The segments or regions can be returned or displayed on a GUI along with the features.

Figure 3A:
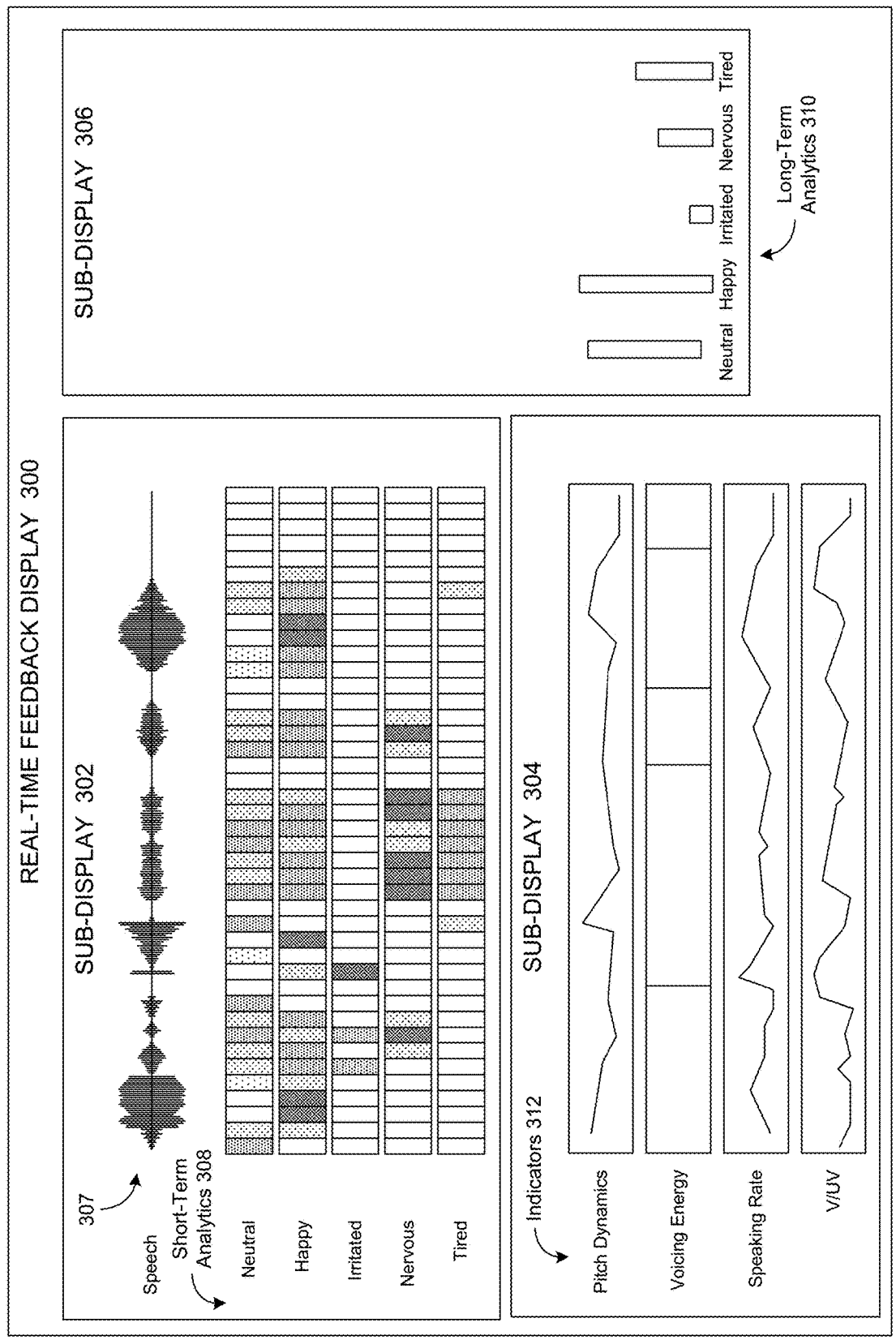
FIG. 3A is a simplified visual display that may be produced by the speech analytics system of FIG. 1.

FIG. 3A is a block diagram illustrating a first example of a real-time speaker state feedback display 300 in accordance with certain embodiments of the disclosed technology. In the example, the display 300 includes a first sub-display 302 configured to provide a real-time visual representation of a plurality of speech-related characteristics and a second sub-display 304 configured to provide a real-time visual representation of dynamic distributions corresponding to the speech-related characteristics. The first sub-display 302 includes a visual representation 307 of a speech signal (e.g., speech input 105) and a visual representation 308 of a number of short term speaker state analytics (e.g., neutral, happy, irritated, nervous, tired), which are derived from short-term segments of the speech signal using the technologies described herein. Shaded portions of the visual representation 308 correspond to portions of the speech signal from which the system 106 has inferred the various speaker state analytics. For example, darker shading may indicate a stronger correlation with a particular speaker state, lighter shading may indicate a weaker correlation with a speaker state, and no shading may indicate no correlation with a speaker state. The second sub-display 304 provides a graphical representation of the measurements of various speaker state indicators 312 (e.g., pitch dynamics, voicing energy, speaking rate, and Voice/Unvoiced, where voicing means that the sound has periodicity), and changes in each of the indicators 312 over time. The speech-related characteristics may include, but are not necessarily limited to, any or all of the following: emotional arousal, speaking rate, mean pitch, pitch dynamics, intensity, voice/unvoiced ratio, voicing energy, and intensity dynamics. A third sub-display 306 may be implemented to provide a visual representation of a quantitative value associated with each of a plurality of identified speaker state analytics 310, such as happy, irritated, and tired, over a longer time interval. For example, the vertical bar for the "neutral" speaker state" indicates a longer-term measurement that is based on the short term measurements 308 shown in the sub-display 302, and similar vertical bars indicate longer-term analytics for the other measured speaker states. As such, the sub-display 306 can provide an estimation of the user's overall state throughout the course of the entire longer term time interval, whereas the information in the sub-display 302 provides more or less instantaneous estimates of the user's state at discrete time intervals or sample times. In certain embodiments, a real-time listing of detected words spoken by the speaker may also be displayed, e.g., by the first sub-display 302, as shown in the first sub-display 352 of FIG. 3B, described below.

Figure 3B:
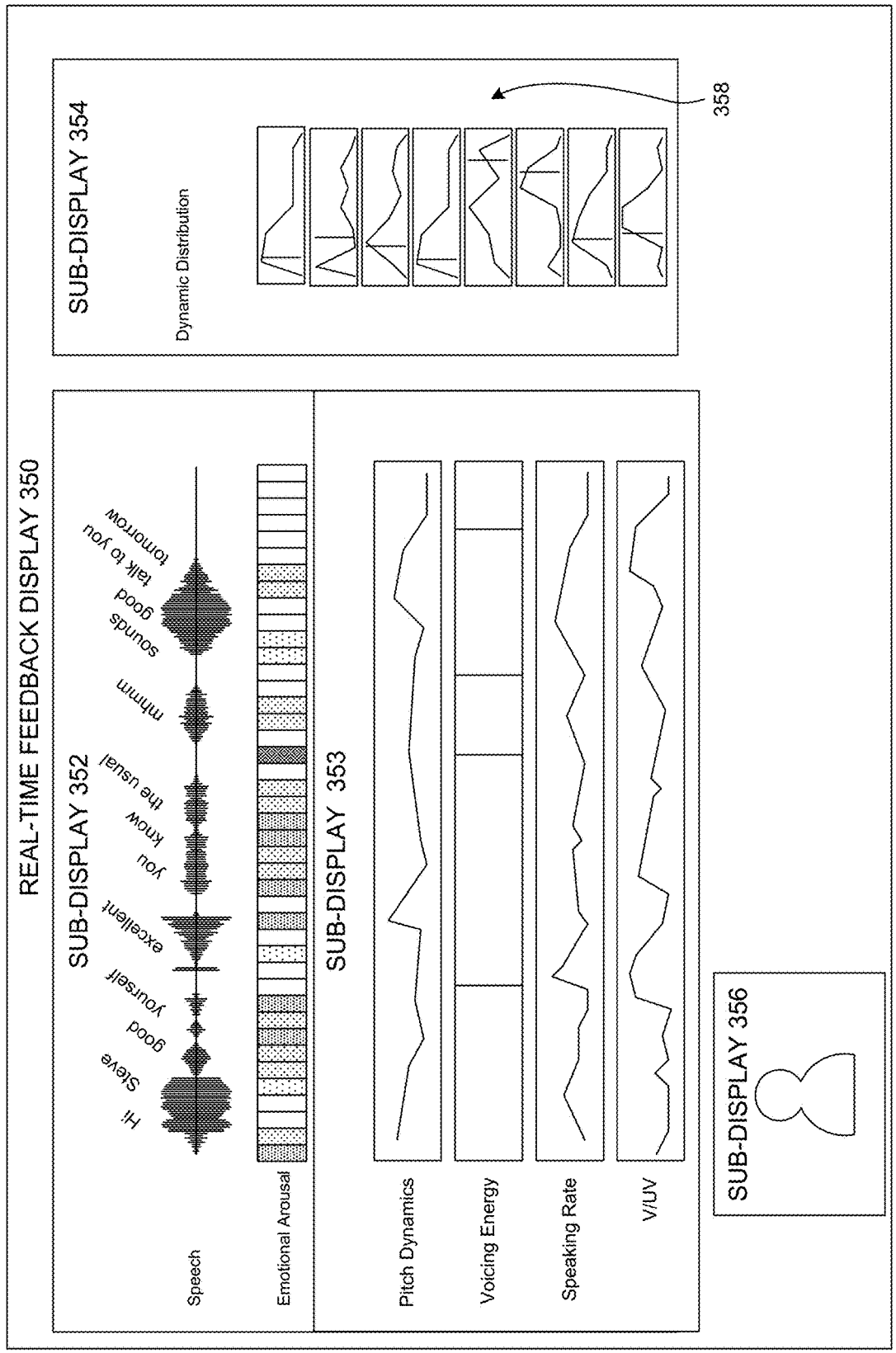
FIG. 3B is another simplified visual display that may be produced by the speech analytics system of FIG. 1.

FIG. 3B is a block diagram illustrating a second example of a real-time speaker state feedback display 350 in accordance with certain embodiments of the disclosed technology such as that described above. In the example, the display 350 includes a first sub-display 352 configured to provide a real-time visual representation of at least one speech-related characteristic, as well as a real-time listing of detected words spoken by the speaker, a second sub-display 353 configured to provide a real-time visual representation of dynamic distributions corresponding to various speech-related characteristics and a third sub-display 354 configured to provide a real-time visual representation of dynamic distributions 358 corresponding to the speech-related characteristics. Each distribution 358 corresponds to a different feature or speech-related characteristic. The speech-related characteristics may include, but are not necessarily limited to, any or all of the following: emotional arousal, speaking rate, mean pitch, pitch dynamics, intensity, voice/unvoiced ratio, voicing energy, and intensity dynamics.

In certain embodiments, the feedback display 350 may include a fourth sub-display 356 having a video presentation of the speaker during the speech event, for example. Alternatively or in addition thereto, the fourth sub-display 356 (or another sub-display) may be configured to visually present the words being spoken by the speaker during the speech event. The words may be preserved for later presentation or review of the speech event, for example. It should be understood that there are many various ways that the system 106 may output speaker state analytics, visually and/or otherwise, and FIGS. 3A and 3B illustrate just two possible approaches.

Certain versions of the device, system, or computer program product may, alternatively or in addition thereto, provide as output data relating to the "local" or "absolute" indicator of speaker state for the current speech session, e.g., during the current session the speaker appears to be frustrated, global indicator, or historical indicator. Embodiments of the disclosed technology may be implemented as an application or "app" configured to provide speaker state analytics interactively while a person is speaking. For example, the app may be installable on a mobile or wearable computing device and operation of the app may be conditioned on the user's consent and may be triggered explicitly, e.g., by user selection/launching of the app, or implicitly by detection, e.g. by a microphone of the device, of a speech signal of a certain length or quality. In the case of wearables, positive and/or negative social episodes may be detected for matters pertaining to the speaker's wellness.

Alternatively or in addition thereto, the disclosed technologies can operate on previously recorded speech material. For example, one or more speech analytics engines can process a live streaming speech signal or the audio signal component of a recorded video and tag or annotate segments of the audio with applicable speaker state indicators as determined by one or more speech analytics engines, or output a measurement of speaker state (such as a numeric value or alphanumeric label or category).

Certain implementations of the systems, devices, methods, and/or platforms described herein may be designed to interface with a calling program, such as a domain-specific front-end software application. Such software may be configured to capture the speech and/or audio signals using one or more microphones, for example, and feed them to the speech analytics platform. The speech analytics platform may be configured to select one or more speech analytics modules to operate on the audio signal, where each speech analytics module may be configured to implement a set of algorithms to perform a specific type of speaker state analytics.

In certain embodiments, the platform may apply a single type of analytics or a combination of different types of analytics to the audio signal, e.g., depending on the requirements or request of the front-end software or for other reasons. For example, the platform may invoke a combination of any of a number of emotion, physiological, and/or cognitive analytics modules, or only a single emotion, physiological, or cognitive analytics module. The speech analytics platform may be configured to output results, such as information about features detected in the audio signal and/or inferences drawn based on the extracted features, for use by the front end software and/or other applications, systems, and services.

In certain embodiments, the speech analytics platform may be implemented as a set of instructions embodied in one or more non-transitory computer readable media, e.g., where the instructions are executable by one or more processors (such as microprocessors, controllers, and/or application specific integrated circuits). For instance, the speech analytics platform may be implemented on a single computing device (such as a server, desktop, mobile or wearable computing device) or using a combination of devices (such as a mobile or wearable device in communication with one or more server computers over a communications network, e.g., the Internet). The various modules and components of the speech analytics platform may be implemented in computer software, firmware, hardware, or a combination of hardware, firmware, and/or software.

In certain implementations, the speech analytics platform may utilize data received from other sources to select the type of speaker state algorithms to apply to the audio signal or as inputs into the analytics algorithms. For instance, mobile phone implementations of the platform may utilize a person's phone or text messaging history, time of day, geographic location, or other data collected by the phone, to condition the speaking activities into categories that may be correlated with different speaking styles and/or social relationships of the person.

In certain implementations, the speech analytics platform may perform a longitudinal analysis, e.g., an analysis of speech samples captured over a period of time, and then output data indicative of directional state changes. For example, increases and/or decreases in the level of a person's emotional intensity or cognitive ability can be inferred from an analysis of speech signals sampled over a period of time, including over a series of repetitive sessions, such as may be done in therapy sessions.

Indeed, longitudinal analysis of data can usually reveal important information about user state changes. Such analysis often involves multidimensional features that may not be directly connected to the underlying subjective user state. Certain implementations may be used to represent a user's directional state change when two time points are considered, thus enabling humans to easily interpret complicated data by only needing to understand simple directional changes of subjective variables. Consider an example in which a tool assesses depression levels of subjects over repetitive sessions and describes their state as improving or not. While a doctor might have difficulty understanding the speech characteristics of the sessions, a tool in accordance with the disclosed technology can present a mapping of the complicated speech variables to a simple variable describing the change of levels over time in a manner which the doctor can understand.

In certain implementations, speech features and characteristics observed over two different time periods may be jointly modeled. In one example, the system can model the direction of change of a subjective variable using a supervised approach and then map other features into the subjective variable. Alternatively or in addition thereto, the system can jointly model the speech features and characteristics observed at two different time points and assess the direction change of the underlying subjective variable relative to those time points. Such implementations can include the comparing of distributions over a specified period of time, for example.

In a therapy session, for example, the subjective level can be a level of stress, e.g., increasing or decreasing. The two different time points at which the speech is assessed may be the beginning of the session and the end of the session. These two time points can be used to assess the direction of change of the effect, e.g., stress level, by analyzing the intermediate speech features and their temporal ordering.

Certain implementations of the platform produce speaker state analytics in "real time" or "interaction time." For example, the system may output signals that are indicative of the person's emotional state on a visual display screen of a mobile phone, all while the person is talking on the phone. The system may alternatively or in addition provide "coaching" in the form of visual or audio notifications during the call. For example, if the user appears, based on the speech analytics, to be increasingly agitated, the system may display a calming message on the display screen. Similarly, if the user appears to be increasingly distracted, the system might prompt the user to continue the conversation later, e.g., if the person is driving a car, or issue a "wake up" style alert notification.

Implementations of the disclosed technology may be directed toward passive listening of a speaker. For example, the system may passively monitor the speaker's speech not only when the person is talking on the phone but during an entire session, including times when the person is not speaking on the phone.

In certain "real time" implementations of the system, the length or duration of the time window during which a speech signal is captured for analysis may be dynamically allocated, e.g., in order to provide the user or others with timely feedback based on the speech analytics. In such implementations, an algorithm may use a certain technique to dynamically allocate the window length based on how active the user is at that moment. This adaptive technique may be used to gather statistics at variable history context and, when the state is predicted to change fast, the history of statistics used may be smaller and increase as the state is predicted to remain stable. Such techniques are particularly effective in "hiding" the lag between the user input and computer feedback when a longer context is needed for high accuracy.

In certain embodiments, the system may gather extensive historical information of a user's speech over a windowed segment, e.g., greater than 200 milliseconds. While in the same speaker state, in general, the longer the window, the greater the accuracy (but increasing the window may delay the output presented to the user). Large windows may be used in situations where the user is not expected to change his or her state quickly, thus providing the user with a feeling that the system is fast with no lag. Since the user state is expected to be the same over short periods of time in which the state is stable, the user does not perceive the lag of the system. In certain embodiments, the default behavior of the system is to compute the speaker analytics at the highest window possible but, when a pause in the speaker's voice is detected, the window length may be reduced, e.g., to 500 milliseconds, and then linearly increased in 500 millisecond intervals as the speaker speaks without a pause. A voice activity detection system may be used, for example, or any other suitable mechanism, device, or component.

Certain implementations of the disclosed technology are directed to a platform configured to provide speech-derived speaker state data as a service. Such a platform may include a signal preprocessing module configured to enable real-time/interaction-time analytics, e.g., segmentation and speaker activity detection. The platform may also include a library of analytics engines, each of which is configured to output a different type of speaker state indicator.

Implementations of the disclosed technology may be used in conjunction with speaker identification tools to diarize a multi-party recording and direct identified speech to appropriate instances of disclosed analytic engines, for example. Such speaker verification technologies can be used to detect cases of mismatched identity. In addition, such speaker identification technologies can provide detection of additional speaker data in non-labeled speech for building up additional background model information to improve model quality, for example. The detection—and, in some instances, elimination—of background speech, music, or other non-speaker audio can advantageously assist with the minimizing or eliminating of non-clean audio to further enhance model quality.

Certain implementations of the disclosed technology make use of context meta-information for certain scenarios. Such meta-information is generally intended for use in data categorization, selection, and retraining. A live database may support the enrolling of new meta-data to support later data selection for a multitude of categories. Consider an example to support the tracking of the context of a person's speech such as to the circumstances of the speech and to whom the person is speaking. Such meta-data tagging may support various analyses such as how the speaker state changes when the speaker is talking to a machine versus another human, speech to an unknown call center representative versus speech to someone the person knows, speech to a friend versus speech to an acquaintance, or speech to an authority figure versus speech to a colleague or charge. Another type of meta-information may be geographical, e.g., to help visualize emotion levels across geographic regions. As the meta-data becomes richer over time, the underlying data can be grouped in different ways, e.g., to support training and analysis that can extend beyond the initial scope.

The storage of such meta-data information may be used in conjunction with natural language understanding (NLU) queries to produce both data lookups from natural queries as well as system analyses for a query. For example, a user may perform a query such as: "show me the information for jane doe for this week compared to last week."

System usability by non-field experts may be supported both by the outputting of comprehensible analytics as well as normalization to highlight the speaker's most active state relative to other detected states. Integration with user interfaces for displaying time-aligned speaker state information may provide a graphical, non-numerical visualization of speaker state in a way that system users can quickly understand several speaker state variables. This may include representation using different colors for different emotions, varying the color intensity with emotional intensity, highlighting an active emotion by making it visually stand out against other emotions, graphing background emotional state distributions along with current distributions as well as support for varying history length and update frequency, or any combination thereof.

In certain embodiments, the output of emotions and features may be standardized in a format that is easy to process by custom applications that can be tailored to specific domain needs. The naming of time-aligned outputs may allow for a simple configuration of which states should be displayed or hidden as appropriate to particular analysis needs. For real-time analysis, for example, the outputs can be streamed in real-time with low latency (e.g., sub-second) analysis response time. To generalize the provision of data to unknown future applications, an industry standard format may be used that allows for both easily parsing of the data as well as being human readable to add in quick data verification or quick output sanity checking. Our solution has been demonstrated in directly wrapping analytics with a single binary executable, a direct tie between analytics server and client application via network sockets, and a scalable cloud solution which supports multiple independent clients interacting with a farm of backend engines.

In addition to configurations that support real-time, low-latency response, an engine startup time has been engineered to launch quickly with a new model may be implemented. In such implementations, the bringing of a new engine online for use can be done very quickly, e.g., in a matter of seconds.

The models for the runtime system generally do not contain information directly identifying users. Separately, the meta-information may be stored in a model database that can be controlled with secure access to a different machine. Thus, a runtime system for a particular user or background model can output analytics for a particular user or population group but generally does not reverse map to that population group or user. In the case of security, if a runtime system is compromised, the models advantageously do not contain any personally identifiable information that could be useful to an attacker.

In certain implementations, the analytics may support speech input but are not limited to speech. Other data recorded by instrumentation of the user's body during data collection may also be supported for model training. Also, tight integration with other supplementary systems may be used in some system configurations. Examples may include integration with live speech recognition results, speaker identification, speaker verification, speech activity detection, language or accent detection, etc. Thus, analysis of the words currently spoken, representative phonemes, detection or verification of the speaker, and voice activity may all serve as inputs to the analytics engine.

In certain implementations, a key capability of the system may be to support in-the-field training of analytics models by non-experts. In such embodiments, the system trainer generally supports a workflow where inputs marked with certain features can be fed to the system to produce a new model or adapt an existing model. The resulting model can then be selected for use in the runtime system. The size of models generally supports portability such that models trained with various data input sets could exist on a user's filesystem, in a database of models, could be quickly downloaded from a master repository as-needed, or in other ways.

The features used for model training may be dynamic such that engines producing new features can be used in the training, provided they are properly labelled and with appropriate time alignment. Thus, the system can support new features as input as appropriate new features may be identified and collected in the future. Similarly, input data labelling can allow for identifying new speaker state outputs by marking the classification of the input data. Though the intent is to support training to be performed in the field by non-experts, some system tuning by experts or system updates may provide for an improved performance system.

In addition to support for real-time and offline batch processing, the system may support simulated live real-time results for pre-recorded audio. This can be useful to review speaker state visualization and raw feature outputs over a variety of inputs for a particular speaker or group. Multiple user interface (UI) instances could be active simultaneously, e.g., to review similarities and differences in loaded files.

Implementations of the system can perform automated categorization of audio inputs. For example, rather than collecting specific data from only depressed or happy patients, the output analytics features could be used to find categories to group sets of audio into. This could then be used to help automate additional training. Quality or confidence metrics may be used to help the system automatically score how well the input would fit into a certain set for determining inclusion, for example.

In other use cases, the system can include fixed location listening devices to monitor emotion levels of speakers in the nearby vicinity. For example, an office can assess the overall employee emotion level. In an alternate embodiment, monitors in a waiting room can be used to assess frustration levels of those waiting.

The training inputs to the system are generally flexible such that third-party data (e.g., where the data collection was not specifically controlled) can be used as input data/information to the system. In the case of analysis, virtually any audio can be used. In the case of training, any input data would simply need to be appropriately annotated. Each of the analytics engines may include selective feature extraction based on criteria such as the objective of the particular analytics engine, context, etc. Each of the analytics engines may also include extraction and use of verbal content and/or non-verbal acoustic features and/or indicators. These features may be selected from any of a number of different types or categories of features such as: "low-level/static," e.g., pitch; calculated, such as pitch contour; dynamic, such as speaking rate; or "derived" such as an interpretation of speaking rate as indicating "happy" or "relative" meaning involving a comparison to a user's previously-obtained speech analytics.

In certain embodiments, any or all of the analytics engines may use feature conditioning, e.g., use of verbal content to then determine which region of features to analyze, or vice versa, e.g., only use words that have a pitch above a certain threshold. The engines may perform a correlation of one or more extracted feature(s) with a high-level indicator of speaker state. An output generation module may include a synchronization mechanism, e.g. dynamic windowing, to align the indicator output with the speech signal input.

Figure 4A:
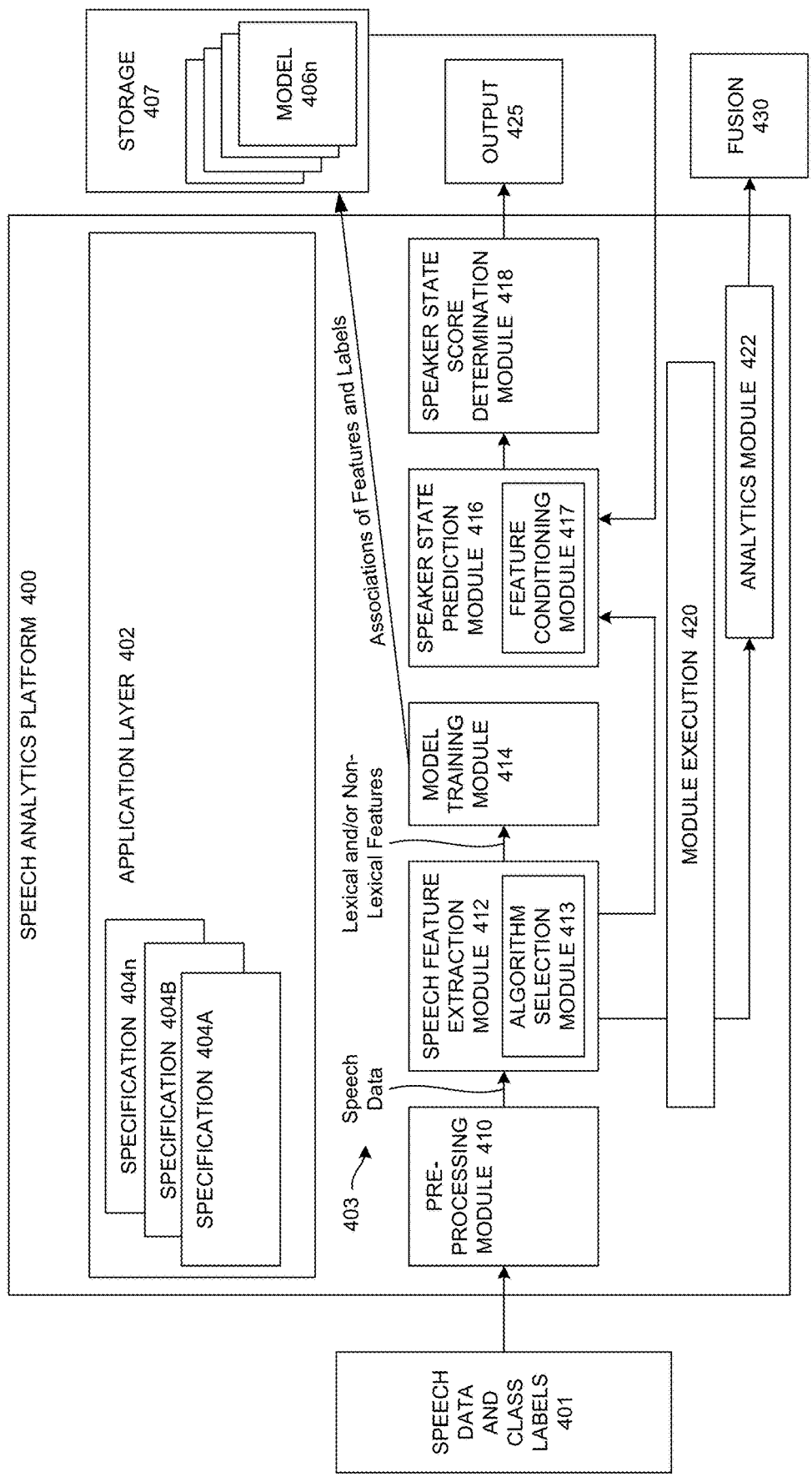
FIG. 4A is a simplified block diagram illustrating an arrangement of machine-implemented components of the speech analytics system of FIG. 1.

FIG. 4A is a block diagram that illustrates another embodiment 400 of the real-time speech analytics platform 106, in accordance with certain embodiments of the disclosed technology. In the example of FIG. 4A, the platform 400 includes an application layer 402, which includes a number of application specifications 404A, 404B, 404N (e.g., domain or application-specific data, rules, models, or instructions), and a speech data processing subsystem 403. The application layer 402 and its specifications 404A, 404B, 404N provide the runtime specifications for one or more particular applications (i.e., domains) with which the speech analytics technology can be used. For instance, the specifications 404A, 404B, 404N may include class labels associated with a particular domain (e.g., a "mental health" application may specify labels such as "depressed", "stressed", etc.).

In operation, the speech analytics platform 400 (e.g., the subsystem 403) receives speech data and class labels 401, which may be obtained from, e.g., an end user and/or the application layer 402. A preprocessing module 410 is configured to receive and perform preliminary processing on the speech data and class labels 401. The preprocessing module 410 provides speech data, upon which feature extraction can be performed. A speech feature extraction module 412 includes an algorithm selection module 413. The algorithm selection module 413 selects the feature extraction algorithm(s) to be used for feature extraction, based on one or more criteria, e.g., the speech data and class labels 401 and/or the specifications 404A,404B,404N. The speech feature extraction module 412 is configured to extract one or more lexical and/or non-lexical speech features from the speech data produced by the preprocessing module 410 using the selected feature extraction algorithm(s).

The speech feature extraction module 412 provides output (e.g., extracted speech features) to a model training module 414 and/or directly to a speaker state prediction module 416. The model training module 414 is configured to use the speech data and class labels 401 and/or extracted speech features to train one or more models 406A-n and store the trained models in a data storage device 407 using one or more supervised machine learning techniques. The trained models 406A-n may be stored in the storage 407 with metadata. Such metadata may include contextual data, such as date, time, geographic location, other speech data, other sensor data, etc., that is associated with the speech data.

To build the models 406n, a module (which may be external to the speech analytics system 400) may convert client data (e.g., data provided by application specifications 404A-n) to a standard format (e.g., a list of speech files, a labels file, and metadata information). The speech data, labels, and metadata may then be fed into the speech preprocessing module 410, and the speech preprocessing module 410 may create a data structure of the labels and metadata (e.g., which may define relationships between the speech features, labels and metadata). The speech preprocessing module 410 may also clean and normalize the speech data, and/or perform speaker activity detection or quality control of the speech samples. Based on the speech data and the metadata, the system may extract the corresponding features from an incoming speech sample.

When a new speaker wants to test or use the platform 400, a model 406n may be selected and loaded in accordance with e.g., the specifications 404n. The selected model 406n may then specify features to be extracted from the new speaker's current speech sample. In other words, once a model 406n is built and trained, the speech processing subsystem 403 acts as a classifier. Based on the extracted features, the speaker state predictions (e.g., scores) may be determined. A speaker state prediction module 416 is configured to perform processing on the information received from the speech feature extraction module 412 based on one or more of the trained model(s) 406n and then provide predicted speaker state output to a speaker state score determination module 418. For instance, the speaker state prediction module 416 applies the model(s) 406n to the extracted features to predict the speaker's current state based on the currently extracted features and/or other information. The speaker state prediction module 416 may include a feature conditioning module 417, which may "condition" the extracted features with e.g., metadata 113, other audio inputs 107, and/or other information, as described above. For instance, the feature conditioning module 417 may discount features that are affected by acoustic aspects of the surrounding physical environment and use that information to improve the accuracy of the speaker state prediction, or the feature conditioning module 417 may select features or weight a prediction based on metadata 113, such as user demographic information, past speech analytics history, and/or other factors. These are just a few illustrative examples; it should be understood that operation of the feature conditioning module 417 can be configured according to the requirements of a particular speech analytics application. The speaker state score determination module 418 is configured to provide an ultimate output 425 that includes a speaker state score or decision representative of the speaker state detected by the platform 400 based on the input speech sample.

In certain embodiments, a module execution interface 420 communicates extracted features produced by the speech feature extraction module 412 to an analytics module 422. The analytics module 422 may be configured to perform further processing on speech information provided by the speech feature extraction module 412. For example, the analytics module 422 may compute additional features (e.g., longitudinal features) using the features extracted from the speech signal by the speech feature extraction module 412. The analytics module 422 may subsequently provide as output information or data, e.g., raw analytics, for use in fusion 430, for example. The fusion module 430 may combine or algorithmically "fuse" speech features (or resultant analytics produced by the platform 400) with other multimodal data. For instance, speech features may be fused with features extracted from data sources of other modalities, such as visual features extracted from images or video, gesture data, etc. The fused multimodal features may provide a more robust indication of speaker state, in some instances.

Figure 4B:
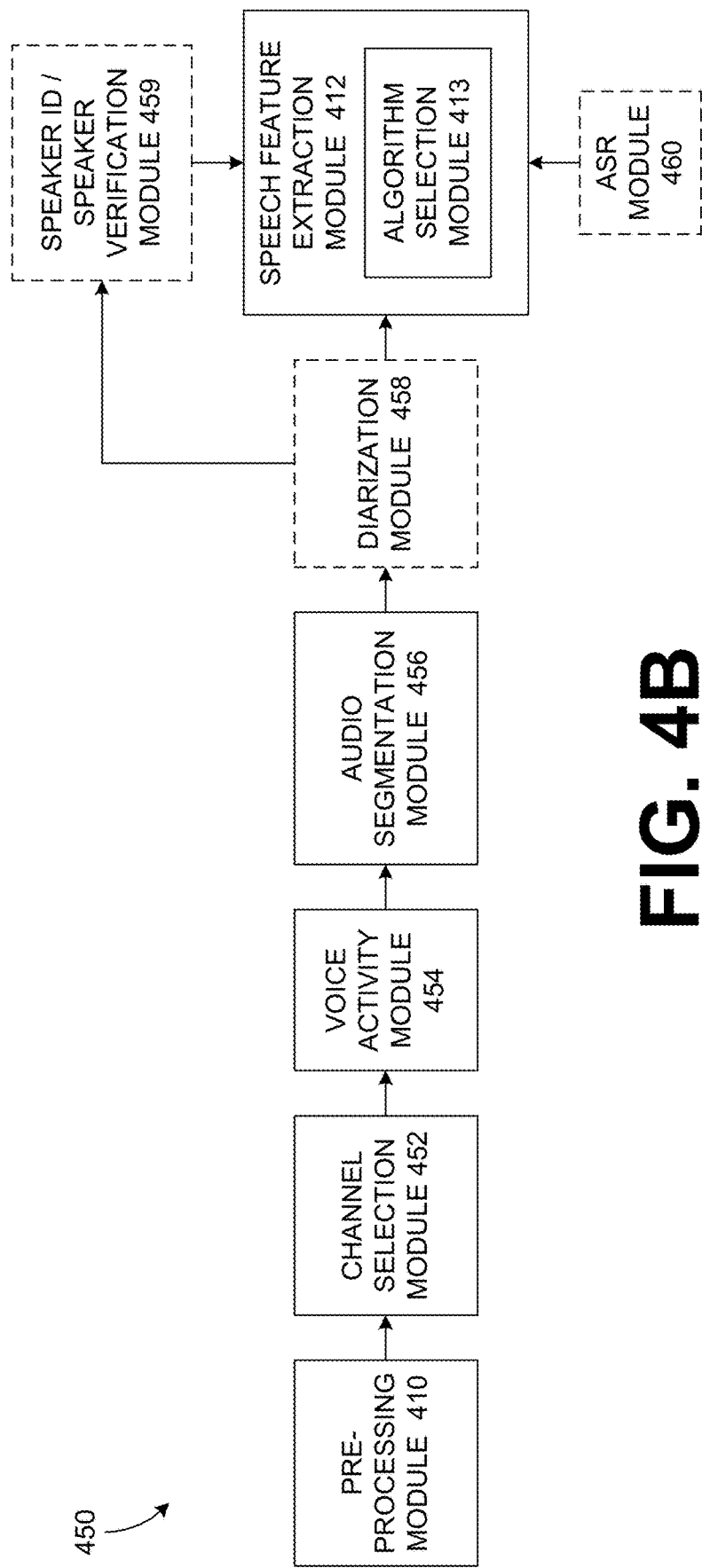
FIG. 4B is a simplified block diagram illustrating another arrangement of machine-implemented components of the speech analytics system of FIG. 1.

FIG. 4B illustrates an alternative embodiment 450 of the speech data processing subsystem 403 of the platform 400. The speech processing subsystem 450 includes optional additional processing modules between the preprocessing module 410 and the speech feature extraction module 412. A channel selection module 452, voice activity module 454, audio segmentation module 456, diarization module 458, speaker identification/speaker verification module 459, and/or automatic speech recognition module 460 may operate on the information passed on from the preprocessing module 410, before such information is processed by the speech feature extraction module 412. The channel selection module 452 determines which (if any) of the modules 454, 456, 458, 459, 460 to invoke for additional processing of the speech data. To do this, the channel selection module 452 may refer to one or more of the specifications 404n provided by the application layer 402. For example, in a multi-microphone environment, the system 106 may be configured to select and utilize the speech input 105 captured at the microphone ("channel") that is located closest to the speaker 102, and then switch to a different channel if the user moves to a new location that is closer to a different microphone, or for any number of reasons the quality of the user's speech signal is better on a different channel (e.g., based on the quality of the hardware or software of the particular audio capture device). The voice activity module 454 may serve to detect the presence of a speech event within an audio sample (e.g., identify segments of the sample that include speech and/or absences of speech/pauses) and may also be configured to receive a speech activity detection (SAD) input from one or more third party components or systems (e.g., a virtual personal assistant (VPA) system). The audio segmentation module 456 may identify segments (defined by, e.g., start and end points) of each portion of speech identified by the voice activity module 454, and may eliminate segments that do not include speech. The audio segmentation module 456 may implement the dynamic windowing and segmenting techniques described herein, and in this way, the audio segmentation module 456 can control or influence the types of features that can be extracted from the speech signal. For example, the audio segmentation module 456 can enable extraction of non-word segmental features and other segment-based features, by the speech feature extraction module 412. In some implementations, features can be conditioned on the segmentation performed by the audio segmentation module 456, and in some cases the segmentation can be performed for each channel and then different segments of each channel may be used for feature extraction.

A diarization module 458 and/or automatic speech recognition (ASR) module 460 may also operate on the speech information prior to its being input to the speech feature extraction module 412. The diarization module 458 may identify speaker turns; that is, given the speech segments identified by the audio segmentation module 456, the diarization module 458 may identify which of those segments are likely spoken by the same speaker (without indicating the identities of the different speakers). For instance, if the speech sample is a recording of a two-person conversation, the diarization module 458 may tag the speech segments as spoken by either "speaker A" or "speaker B". In certain embodiments, speaker verification and/or speaker identification processing may be performed by a speaker verification/speaker identification module 459, prior to the processing of the speech data by the speech feature extraction module 412. The speaker verification/speaker identification module 459 can utilize speaker-specific models to associate speaker identities with the speaker segments identified by the diarization module 458. That is, the speech data of the current sample can be compared to an existing speaker-specific model to verify the identity of the speaker (the speaker's identity matches his or her stated identity) or to identify the speaker (this is who the speaker is). Thus, in the embodiment of FIG. 4B, multiple inputs, in addition to the speech data itself, may be utilized by the speech feature extraction module 412. These additional inputs include, for example, tags that identify speech segments of an audio input, tags that identify changes in speaker turns within the audio input, tags that indicate different speaker identities associated with different segments of the audio input, and/or tags that indicate words or phrases spoken during different segments of the audio input. The speech feature extraction module 412 can use one or more of these additional inputs to "pre-condition" the feature extraction, e.g., by using the additional input(s) to select the feature extraction algorithms as performed by the algorithm selection module 413.

Given an interactive input, specific machine learning models may be specified, e.g., by a speech analytics expert so as to maximize the accuracy of the speech analytics engine given the initial input labels. An input from an ASR may feed words and transcriptions that are used as an input to provide speech analytics based on transcriptions and also compute conditional features. After the models are built, they may be saved in computer memory, on a hard drive, or in the cloud, for example. A separate set of models may be kept as a holdout set to optimize and tune hyper-parameters of the model.

As used herein the term "diarization" generally refers to an automated process for identifying changes in speaker turns within a speech sample, e.g., that the speech at time interval 10 is spoken by a different person than the speech at time interval 5. Diarization does not necessarily determine the identities of the different speakers; just that the speech sample does contain speech spoken by different people.

For a diarization system, multiple systems may be trained for each speaker/modality. Also, the scores produced by the analytics engines may be used to tune the system with respect to the other analytic engines, e.g., as a post-processing step.

Figure 4C:
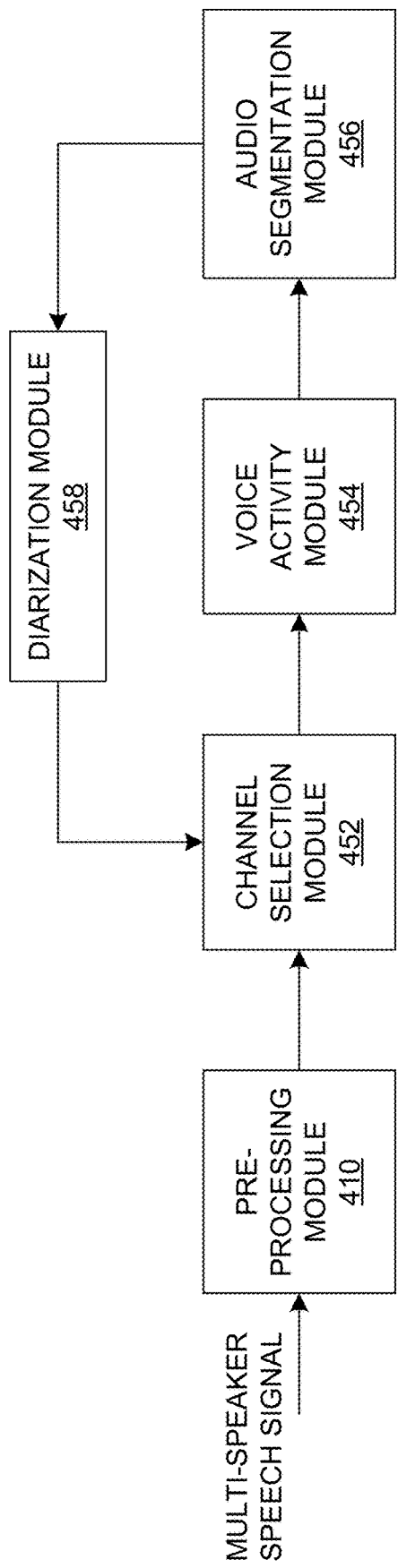
FIG. 4C is a simplified block diagram illustrating another arrangement of machine-implemented components of the speech analytics system of FIG. 1.
Figure 4D:
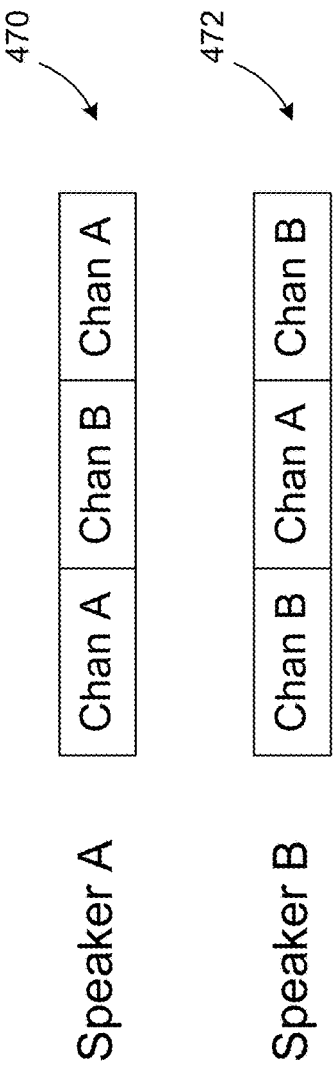
FIG. 4D is a simplified illustration of feature vectors that may be generated by the speech analytics system of FIG. 1.

In FIG. 4C, an alternative embodiment of FIG. 4B is shown, in which a speech signal that contains samples of speech spoken by multiple different users is processed. The embodiment of FIG. 4C performs speaker diarization on the channel selected by the channel selection module 452 and feeds the results of the speaker diarization back to the channel selection module 452. This enables the system 106 to perform feature extraction for multiple users across potentially multiple channels. As a result, the system may generate feature vectors for each speaker in the multi-speaker environment, such as the simplified examples shown in FIG. 4D. In FIG. 4D, the feature vectors 470, 472 are generated by the system 106 for two different speakers, a speaker A and a speaker B, respectively, and each speaker's feature vector includes features extracted from speech segments captured by multiple different channels. For instance, speaker A's feature vector includes features extracted from segments of a channel A and a channel B, and speaker B's feature vector includes features extracted from segments of channel B and channel A. In this way, the system 106 can capture and perform analytics on speech signals from multiple speakers even if the speakers are speaking at the same time, in a multi-channel environment.

Figure 5:
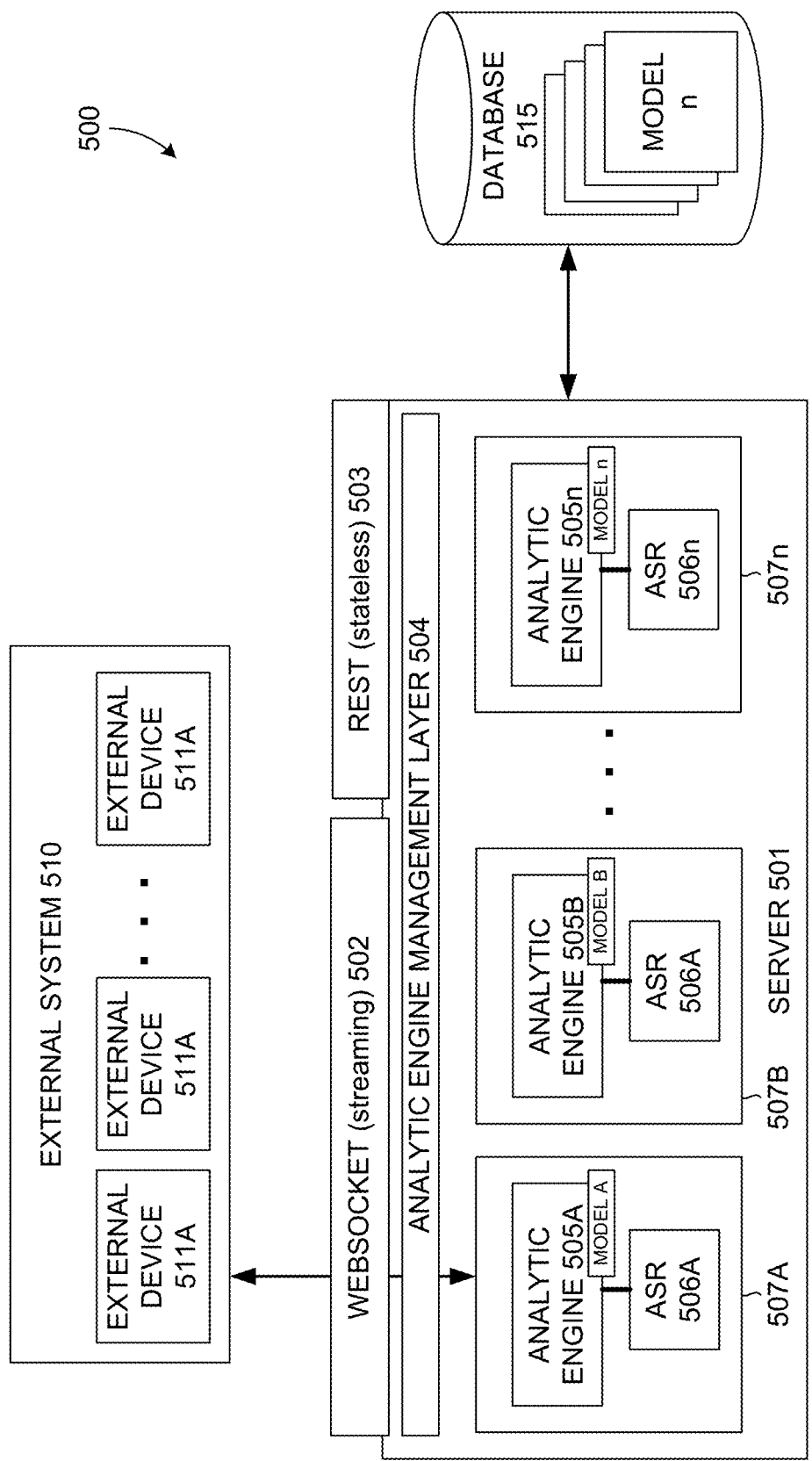
FIG. 5 is a simplified block diagram illustrating an embodiment of a machine-implemented architecture for the speech analytics system of FIG. 1.

FIG. 5 is a block diagram illustrating an example of a centralized (e.g., hosted) speech analytics system 500, which may interact with and provide speech analytics outputs to one or more external systems 510 in accordance with certain embodiments of the disclosed technology. In the example, a server 501 hosts multiple speech analytics sub-systems 507A, 507B, 507n, including analytic engines 505A-n and corresponding ASR modules 506A-n. Each of the analytic engines 505A-n may have a particular (e.g., different) model A, B, n associated therewith. Any or all of the subsystems 507A, 507B, 507n may communicate with one or more external devices 511A-n in the external system 510 via a streaming communication channel such as a web socket 502 (e.g., for streaming data). In alternative embodiments, a REST (stateless) application programming interface 503 may be used to communicate with external system 510. An analytic engine management layer 504 may manage any or all of the communications and/or other interactions between the server 501 and the external system 510. The server 501 may communicate with a database 515 that is configured to store the models, data and/or metadata such as that described herein. One or more of the models stored by the database 515 may be retrieved based on specific populations, metadata, etc. "Communicate" as used here generally refers to electronic communications, such as over a network, and includes any suitable communication medium (e.g., wired, wireless, optical, etc.).

Figure 6:
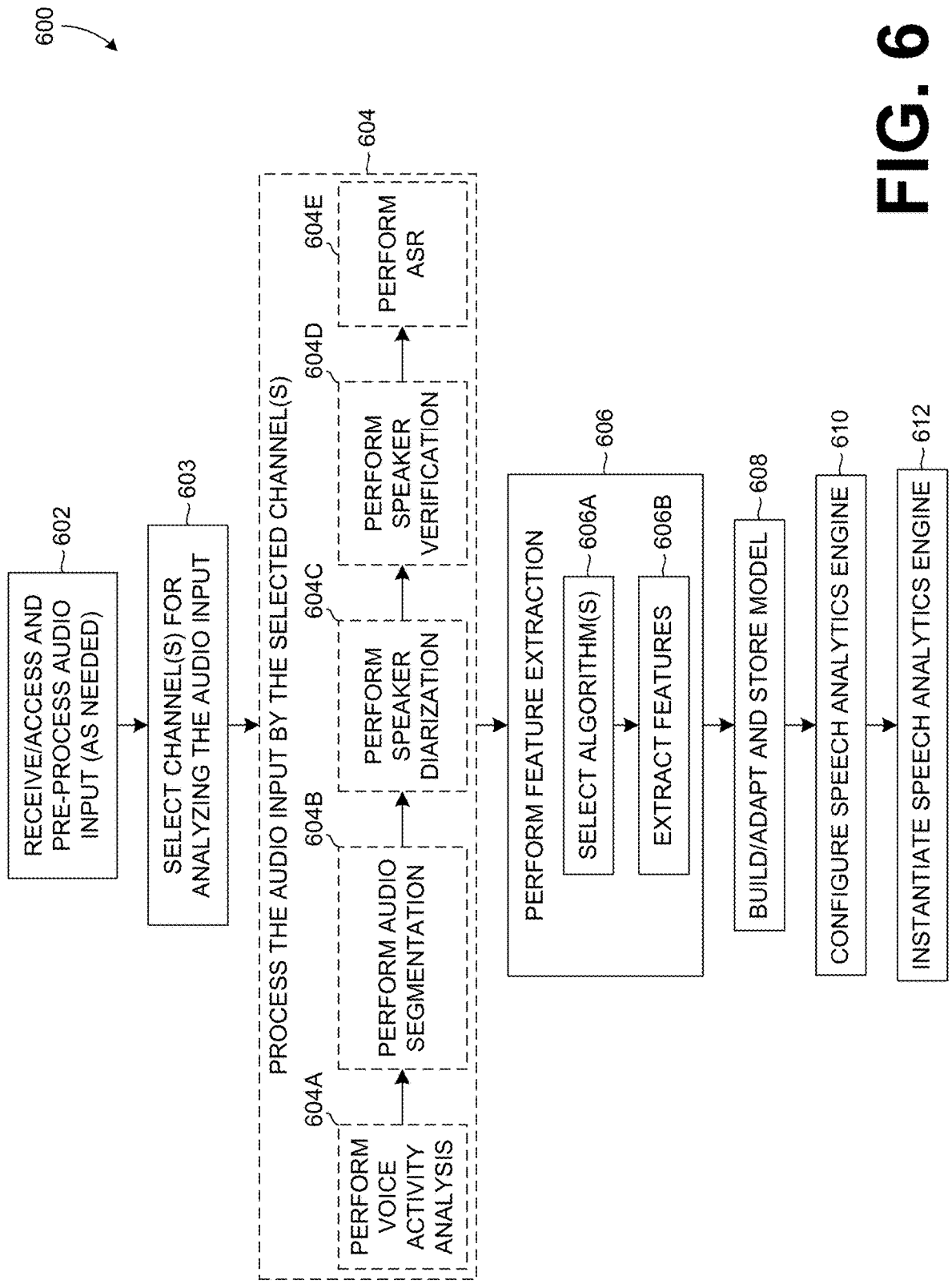
FIG. 6 is a simplified flowchart illustrating an example of a computer-implemented method that may be used for at least partially automated development of a speaker state analytics system in accordance with certain embodiments of the disclosed technology.

FIG. 6 is a flowchart illustrating an example 600 of a computer-implemented method for the development of a customized real-time or interaction-time speaker state analytics module or system, e.g., where the speaker state analytics may be derived from a speech signal, in accordance with certain embodiments of the disclosed technology. At 602, audio input including speech information, e.g., audio input, is collected (e.g., received or accessed, if previously recorded) from a human or synthetic speaker, and pre-processed as needed. At 603, one or more channels may be selected to analyze the audio input produced at 602. Based on the channel selection performed in 603, additional processing of the audio input may be performed in 604 (i.e., any one or more of 604A, 604B, 604C, 604D, 604E may be performed by the computer in response to the channel selection(s) produced by 603).

At 604A, an automated process to detect speech activity in the audio signal may be performed. At 604B, an automated process to segment the audio input based on the output of 604A may be performed. At 604C, an automated speaker diarization process to identify changes in speaker turns in the audio input may be performed, using the output of 604B. In 604D, an automated speaker identification or speaker verification process may be performed, using the output of 604C as well as speaker-specific models developed using, e.g., known speaker modeling techniques. In 604E, an automatic speech recognition process may be performed, to identify words or phrases spoken within the audio input. The ASR process may operate on the audio input as output by any of the preceding processes (e.g., 602, 604A, 604B, 604C, 604D), depending on the requirements of a particular implementation of the system 106.

At 606, one or more speech features are selectively extracted from captured speech, e.g., based on certain criteria such as, for example, labels. At 606A, one or more algorithms are selected to extract one or more speech features from the captured speech. At 606B, the selected one or more algorithms are used to extract the one or more speech features from the captured speech. A model may be built, as shown at 608, and a speech analytics engine may be subsequently configured based on the model, as shown at 610. At 612, the custom analytics engine may then be instantiated in the speaker state analytics system 106.

Certain implementations of the disclosed technology are directed to an electronic device, system, or computer program product configured to provide as output real-time/interaction-time speech-derived speaker state analytics. Such implementations may be configured to provide as output a temporal stream of speaker state indicators in real-time/interaction-time, e.g., as feedback to the speaker "live" (such as during a speech given by the speaker). The speaker state indicators may be compared to indicators derived from one or more of the speaker's previous sessions. In certain embodiments, the distribution of a historical or past sample can be gathered. The indicators that are output may be relative to a customized and/or personalized reference model, e.g., indicating directional change, or local/absolute for the current speech session.

Potential implementations of the disclosed technology are virtually limitless. For example, in the case of emotion, the system/platform may be used to label emotions in a live, e.g., streaming, speech, or to find out whether a speaker is becoming more or less emotional than in a previous sample of speech. The emotion estimates can then be used in real-time to adapt the response of a dialog system. In clinical applications, such estimates may be used for screening/triage. Alternative implementations may be tailored to monitor a person's health. Other implementations may be used to test advertising.

Certain implementations may be tailored to educational software to estimate student state and/or changes in student state in read speech samples over time. Further alternative implementations may be suitable for military training exercise reviews to mark stress and/or urgency in radio communications, or to help an instructor find rare, important events quickly and effectively, for example.

In addition to state level outputs, the indicators that underlie the state outputs can be used directly to improve state tracking in applications that fuse information from multiple sources. Because speech is naturally occurring, and capturing speech is noninvasive, speaker state tracking can be used for monitoring for health condition changes, particularly if the speaker is known and the models can thus be personalized. For example, certain implementations may be used for passive monitoring, e.g., via permission on a speaker's cell phone, to monitor for changes in the speaker's state, and also to alert the speaker if an action needs to be taken.

In such embodiments, the system may be configured to take samples when available, e.g., each time the user talks into his or her cell phone or virtual personal assistant (VPA) or plays a video game, for example. The speaker's speech may thus be analyzed over a period of time and, in certain situations, may yield results that are substantially equivalent to what would have resulted from a 45-minute interview with the speaker. The pertinent metadata may include, but is not limited to, information pertaining to the user's personal device, such as the phone number of the user, what phone numbers the user calls, the type of device used to make the calls, whether the person being called is in the user's address book, who initiated the call, length of the call, timestamp and date information pertaining to the call(s), geographic location (e.g., GPS coordinates), statistics based on any of these, speaker demographics based on the user's account. etc. Other metadata can include, for example, information from a database used by a doctor, e.g., age, gender, health conditions, and language. Certain implementations of the disclosed technology can make use of metadata (e.g., contextual information about the speaker or the speech) to perform population matching or to condition features, both of which typically result in improved performance. Also, the metadata may be used to let clients request specific population matching and create a variety of analytic engines. Population matching may use metadata to select the training data that is closest to that of the application data, such as using speakers from the same gender, or calls from the same time of day, or metadata based on monologue or dialogue, as the application data.

Feature conditioning may use metadata to modify the set of features used. For example, features that are less robust to noise may be removed if the metadata suggests that the audio is from a call made while in a vehicle or if there is cross-talk from other speakers. In certain embodiments, the system can learn how metadata (such as the other talker(s) in a conversation) can influence how inputs from others cue states, since people speak differently depending with the person(s) they are talking with. The system can use such cues to enhance the speaker analytics systems or provide additional information about the conversation. Other applications may include call center analytics in which the metadata can be used to analyze the behavior of the user or the agent using different models. Also, it can be used to analyze the users based on certain population characteristics such as gender characteristics, for example.

Certain embodiments may include two channels, e.g., a telephone call between two people: an agent and a user. In such embodiments, the system can detect/identify the speaker and/or the agent using diarization, for example. Other embodiments may include more than two parties.

Such embodiments may include, for example, a call center, an agent, and one or more customers.

For diarization, a multi-stream signal may be routed using a module configured to route specific channels either from a multistream signal or specific devices. This module may also be responsible for detecting speech from noise before any speaker segment and thus creating speech segments from one or more streams. A separate module may be used to detect the number of speakers in the conversation and also identify the segments in which each speaker speaks. Then, the output of this module may be passed back to the routing module to route the speaker specific signal to the analytic engines to match the population characteristics. For example, the engine may have information about the speaker gender and use specific models for that gender. Other information may include an indication as to whether the speaker is a user or an agent in a call center.

In certain embodiments, a postprocessing module may be used before displaying features and output on the screen to align based on the corresponding of each feature analytic. The module may pass the absolute time-stamp information of the machine to other components, for example, a video display component, to align the two when they are out of sync. The same may happen to align the speech input from multiple sources and the analytic scores for display purposes.

The routing module may be configured to distribute the speech signal to various analytics engines based on the specification of a client application, system, or device. The module may have the ability to launch multiple analytic engines, keep the speaker and signal information of each machine, and route independent signals (e.g., independent speakers or independent calls from a call center) to separate analytic engines and parallelize the work. The module may also keep an accounting of which signal ended or which has more information to stream. Based on that information, it may keep a set of predetermined analytic engines ready to accept audio and, once a session ends, close the analytic engine and start a new session.

FIG. 7 is a block diagram illustrating an example of an integrated model training environment (ITE) 700 in accordance with certain embodiments of the disclosed technology. The illustrative ITE is embodied as a machine-implemented, user-enabled model training apparatus for the development of a customized interaction-time speaker state analytics model. The ITE 700 includes model generation tools 710, a model training user interface (UI) 716, model generation services 720, and at least one data storage device 730. The data storage device 730 may store one or more of: trained and/or untrained models 732, annotations 734, labels 736, and speech data 738.

A set of user data elicitation and labeling tools (e.g. a sub-system) 711 of the model generation tools 710 includes a data elicitation module 712 and an audio annotation module 715. The data elicitation module 712 includes an elicitation generation module 713 and elicitation execution module 714. In general, the modules 712, 713, 714 allow for eliciting speech data from a human subject, recording the elicited speech data, and annotating the elicited speech data with metadata such as gender, age, emotion, type, time, duration, format, etc. In other words, the data elicitation and labeling tools 710 can facilitate the generation of training data that can be used to build a speech analytics model for use in connection with the speech analytics system 106.

The audio annotation module 715 may provide manual and/or automatic annotation of audio data including labeling and assistive tools such as measurement of audio quality, audio format, and audio levels. The audio annotation module 715 may also include active learning where low-confidence automatic classification may be re-routed to the user for manual classification, for example. In other words, the audio annotation module 715 can facilitate the process of a human analyst adding speech analytics labels to the training data generated by the data elicitation module 712, and/or the audio annotation module 715 can generate labels for the training data in an automated fashion by using existing classifiers, for example. In instances where a classifier indicates a low confidence score in its classification of the training data, the audio annotation module 715 can notify the human analyst and allow the human analyst to review and edit the system-generated classification as needed.

The audio annotation module 715 may be used to create consistent class labels for server models that are settable when a user starts the annotation process. Data quality annotation checking and optional user metadata may be used. The annotation module 715 may interact with a server to store the annotated speech (e.g., in data storage 730). A separate module may receive the speech data and optional user-generated or computer-generated annotations and/or labels.

The annotation module 715 may be used simultaneously by virtually any number of users. A GUI with auto-generated or pre-configured elicitation procedures may be used to record speech and gather annotations from the users (e.g., human subjects) and also allow the users (e.g., the human subjects or analysts) to add metadata including, for example, gender and/or age before, during, and/or after recording. The annotation module 715 may communicate the labels to other devices or systems and/or save the labels in data storage, in real-time. The annotation module 715 or another module may allow for the adding and integration of audio samples and labels obtained from a third party (such as a third party database of training data). In certain implementations, the annotation module 715 may have or otherwise communicate with/via an API that interacts with an automated tool to allow automated annotations of the speech data.

In certain implementations, the annotation module 715 may read user-uploaded data and provide the user with a classification for the uploaded data. The user receives classification output for the uploaded data, e.g., using an initial model, and the next time the user has data to upload, the data may first be passed through the initial model. The output of this process may include a list that includes a prioritization of other data files to annotate. The user may then annotate the data files based on the system-generated prioritization, e.g., to save time, and then upload the data. The user may receive classification output on all of the data and then use the classification output to train a new model.

A user-enabled model trainer user interface (UI) 716 may include or interface with various tools for searching, retrieving, and selecting annotated audio data to be submitted to the model generation module 723 described below. The model trainer UI 716 may search and retrieve audio from the speech data 738 and annotations 734 using an audio search, storage, and retrieval module 722. The user may submit the annotated speech to the user enabled model training and adaptation module 724, described below. The trainer UI 716 may retrieve the trained model and store it in a non-transient memory (e.g., data storage 730). In certain optional embodiments, the trainer UI 716 may submit a store operation to the data storage 730.

The model generation services includes an analytics module 721 (including a trained model 725) (e.g., a classifier), an audio search, storage, and retrieval module 722, a model generation module 723, and a model training and adaptation module 724. The audio storage and retrieval module 722 may interface with the data storage 730 (e.g., through the model training UI 716) to store incoming audio data and metadata and provide full text search and retrieval based on all available attributes, for example (e.g., third-party audio data and corresponding annotations).

The audio storage and retrieval module 722 may be configured to search for and retrieve speech in a predetermined format, and may perform any or all of the processes shown in 603, 604 (604A, 604B, 604C, 604D, 604E) of FIG. 6, described above. The audio storage and retrieval module 722 may select one or more channels (e.g., by performing 603 of FIG. 6). Based on the plurality of selected channels, diarization (e.g., 604C), speaker detection or speaker verification (e.g., 604D) operations may be performed. For example, a selection of the plurality of channels may be sent to a voice activity detection module (which may perform, e.g., 604A) in order to select only the speech portion(s) of the signal. Voice activity detection (e.g., 604A) and audio segmentation (e.g., 604B) may be used to segment the audio and isolate the speech portion as well as segment the signal into speech and non-speech regions.

The audio storage and retrieval module 722 may utilize a communication protocol to perform a search and retrieval of annotated speech data from a non-transient memory and also receive and store annotated audio data requests.

A model generation module 723 may include tools for generating a model from provided audio data. The model generation module 723 may be configured to receive audio, speech signals, and annotations from the trainer UI 716 and, in certain implementations, a preprocessing module (e.g., module 410 of FIGS. 4A and 4B, described above) may be used to convert the input speech to a predetermined format, perform normalization, etc.

An analytics module 721 may execute speech analytics algorithms to classify audio information based on a trained model 725. The audio storage and retrieval module 722 may initiate a search and retrieve annotated speech data from non-transient memory and then perform a new search based on at least partially on metadata associated with the retrieved speech data. The audio storage and retrieval module 722 can then submit the retrieved audio to the analytics module 721 for classification. The analytics module 721 may select one or more feature extraction algorithms to extract one or more speech features from the speech signal based at least in part on certain criteria as well as inputs from ASR (e.g., 604E of FIG. 6) and/or speech segmentation (e.g., 604B of FIG. 6), for example.

The one or more feature extraction algorithms may selectively extract one or more speech features from the speech signal based at least in part on certain criteria (e.g., by process 606 of FIG. 6). The model generation module 723 may build a model 732 based at least in part on the labeling 736 and annotation 734 stored in the database 730 from users, for example. The model generation module 723 may also inform the trainer UI 716 and return the model 732 to the trainer UI 716, which can be configured to display the information of the model 732 to a user, for example.

The output of the analytics module 721 may include annotated speech as well as a confidence score, which may be provided to a user to re-label, as needed.

The model training and adaptation module 724 may include tools for creating or adapting a model 732 from incoming audio data (which may be stored as 738) including live adaptation, as well as tools for model storage and retrieval. The model training and adaptation module 724 may be configured to receive speech data and annotations from an API (e.g., 204, 208A, 208B, 208n of FIG. 2, or 502 or 503 of FIG. 5), or based on user input, and may initiate a model training process based at least partially on criteria such as labels, audio quality, population/demographics, gender, and speaker, for example.

The data storage 730 may be configured to store a plurality of models 732, annotations 734, labels of speech 736 or virtually any combination thereof, among various other data (including speech data 738) and/or other information.

FIG. 8 is a block diagram illustrating an example of a networked system 800 in which embodiments of the disclosed technology may be implemented. In the example, the system 800 includes a network 802 such as the Internet, an intranet, a home network, or any combination thereof. Traditional computing devices such as a desktop computer 804 and laptop computer 806 may connect to the network 802 to communicate with each other or with other devices connected to the network.

The networked system 800 also includes three mobile electronic devices 808-812. Two of the mobile electronic devices, 808 and 810, are mobile communications devices such as cellular telephones or smart phones. The third mobile electronic device, 812, is a handheld device such as a personal data assistant (PDA) or tablet device. Any or all of the devices 804-812 may interact directly or indirectly with each other. A server 813 may manage and/or otherwise interact with any or all of the devices 804-812 over the network 802.

The networked system 800 also includes a storage device 814, which may be a central database or repository, a local data store, or a remote storage device, for example. The storage device 814 may be accessible to any or all of the other devices 804-812, subject to limitations or restrictions by the devices 804-812, a third party, or the storage device 814 itself. The server 813 may manage and/or otherwise interact directly with the storage device 814.

The storage device 814 may be used to store some or all of the public data that is accessed and/or used by any of the computers 804 and 806 or mobile electronic devices 808-812. In situations involving personal data, the storage device 814 may also store any or all of the personal data accessed and/or used by any of the computers 804 and 806 or mobile electronic devices 808-812. Privacy controls may be implemented to preserve privacy information pertaining to a speaker's identity information, speech features, or both.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A system for providing speech-derived speaker state data, the system comprising:
   a speech data processing subsystem embodied in one or more non-transitory machine accessible storage media, the speech data processing subsystem configured to produce speech data corresponding to a variable-length time window of audio input captured from a human or synthetic speaker;
   a plurality of analytics engines embodied in one or more non-transitory machine accessible storage media, wherein an analytics engine of the plurality of analytics engines is configured to analyze speech data produced by the speech data processing subsystem and provide as output speaker state data, the plurality of analytics engines comprising
   a plurality of algorithms configured for different types of speaker state analytics, at least one of the plurality of algorithms analyzing at least one non-word feature of the speech data and outputting speaker state data relating to a type of speaker state analytics for which the at least one of the plurality of algorithms has been configured;
   wherein the speech data processing subsystem is configured to use the variable-length time window to determine and output the speaker state data, the speaker state data aligned with time and indicative of at least one correlation between the speech data and at least one short-term measurement of a speaker state analytic and at least one correlation between the speech data and at least one longer-term measurement of a speaker state analytic; and
   an output generation module configured to determine, based on the variable length time window, whether to output or hide particular speaker state data produced by one or more of the plurality of analytics engines.

2. The system of claim 1, wherein the speech data processing subsystem is configured to perform at least one of: speaker identification by determining who the speaker is, and speaker verification by determining whether the speaker's identity matches a stated identity of the speaker.

3. The system of claim 1, wherein at least one of the plurality of analytics engines is further configured to extract one or more speech features from the speech data based at least in part on a criterion specified by end user software.

4. The system of claim 1, wherein at least one of the plurality of analytics engines is configured to extract from the speech data lexical content, non-lexical acoustic features, or a combination of lexical content and non-lexical acoustic features.

5. The system of claim 1, wherein the at least one non-word feature comprises one or more of: low-level features, static features, calculated features, dynamic features, derived features, and relative features.

6. The system of claim 1, wherein at least one of the plurality of analytics engines is further configured to use output of an automatic speech recognition module to determine one or more non-lexical speech features to be analyzed.

7. The system of claim 1, wherein at least one of the plurality of analytics engines is further configured to provide the speaker state data as input to a speech recognition operation.

8. The system of claim 1, wherein each of the plurality of analytics engines further comprises a synchronization mechanism to visually align the speaker state data with output corresponding to the audio input.

9. The system of claim 8, wherein the speaker state data and the output corresponding to the audio input are visually presented to the speaker in real-time during a speech session by the speaker.

10. The system of claim 1, wherein the system is configured to identify a segment of the audio input spoken by a user calling a call center and to identify a segment of the audio input spoken by an agent of the call center with whom the user is speaking.

11. The system of claim 10, wherein the one or more algorithms are configured to determine a speaker state score for the user based on the segment of the audio input spoken by the user and to determine a speaker state score for the agent based on the segment of the audio input spoken by the agent.

12. The system of claim 1, wherein the speech data processing subsystem is further configured to dynamically change a size of the variable-length time window based on a characteristic of the audio input.

13. The system of claim 12, wherein an initial window size of the variable-length time window is greater than about 200 milliseconds.

14. The system of claim 12, wherein a beginning of the captured audio input corresponds to the speaker beginning to speak.

15. The system of claim 12, wherein an initial window size of the variable-length time window is configured based on requirements of a speech analytics application.

16. The system of claim 12, wherein the speech data processing subsystem is configured to increase a size of the time variable-length window to an extended window size responsive to the captured audio input exceeding the initial size.

17. The system of claim 16, wherein the speech data processing subsystem is configured to stop increasing the size of the variable-length time window at a maximum window size.

18. The system of claim 16, wherein a speech data processing subsystem is configured to stop increasing the size of the variable-length time window responsive to the speaker stopping speaking.

19. The system of claim 18, wherein a maximum window size of the variable-length time window is about 15 seconds.

20. The system of claim 19, wherein the maximum window size is configured based on requirements of a speech analytics application.

* * * * *